US011472340B2

(12) United States Patent
De Wind et al.

(10) Patent No.: US 11,472,340 B2
(45) Date of Patent: *Oct. 18, 2022

(54) METHOD OF MAKING A MIRROR SUBSTRATE FOR A VEHICULAR REARVIEW MIRROR ASSEMBLY

(71) Applicant: MAGNA MIRRORS OF AMERICA, INC., Holland, MI (US)

(72) Inventors: Darryl P. De Wind, West Olive, MI (US); Michael J. Baur, Kentwood, MI (US); Timothy G. Perkins, Ada, MI (US)

(73) Assignee: MAGNA MIRRORS OF AMERICA, INC., Holland, MI (US)

(*) Notice: Subject to any disclaimer, the term of this patent is extended or adjusted under 35 U.S.C. 154(b) by 258 days.

This patent is subject to a terminal disclaimer.

(21) Appl. No.: 15/929,324

(22) Filed: Apr. 27, 2020

(65) Prior Publication Data

US 2020/0254932 A1 Aug. 13, 2020

Related U.S. Application Data

(63) Continuation of application No. 16/258,789, filed on Jan. 28, 2019, now Pat. No. 10,632,921, which is a
(Continued)

(51) Int. Cl.
*B60R 1/04* (2006.01)
*B60R 1/12* (2006.01)
(Continued)

(52) U.S. Cl.
CPC .................. *B60R 1/04* (2013.01); *B24B 9/02* (2013.01); *B24B 9/08* (2013.01); *B24B 13/00* (2013.01);
(Continued)

(58) Field of Classification Search
CPC ........... B60R 1/04; B60R 1/086; B60R 1/088; B60R 1/12; B60R 1/1207; B29B 9/02;
(Continued)

(56) References Cited

U.S. PATENT DOCUMENTS 1,949,138 A 2/1934 Bell
2,616,335 A 11/1952 Mazur
(Continued)

FOREIGN PATENT DOCUMENTS

DE 2254511 A1 5/1974
DE 2362191 A1 6/1975
(Continued)

OTHER PUBLICATIONS

International Search Report and Written Opinion dated Jun. 21, 2010 for corresponding PCT Application No. PCT/US2010/032017.
(Continued)

*Primary Examiner* — Collin X Beatty
(74) *Attorney, Agent, or Firm* — Honigman LLP

(57) ABSTRACT

A method of making a mirror substrate for a vehicular rearview mirror assembly includes providing a glass substrate having a planar front surface, a planar rear surface and a circumferential perimeter edge. The glass substrate is positioned at a fixture and the front perimeter edge portion of the glass substrate is ground by moving a grinding wheel around the periphery of the glass substrate to establish a rounded surface about and around the periphery of the glass substrate and between the planar front surface and a rear portion of the perimeter edge of the glass substrate. The rounded surface has a radius of curvature of at least 2.5 mm. The rounded surface provides a curved transition between the planar front surface of the glass substrate and the rear
(Continued)

portion of the perimeter edge of the glass substrate. The planar rear surface of the glass substrate is coated with a coating.

20 Claims, 24 Drawing Sheets

Related U.S. Application Data continuation of application No. 15/338,779, filed on Oct. 31, 2016, now Pat. No. 10,189,407, which is a continuation of application No. 14/641,813, filed on Mar. 9, 2015, now Pat. No. 9,481,303, which is a continuation of application No. 13/964,136, filed on Aug. 12, 2013, now Pat. No. 8,976,439, which is a continuation of application No. 13/265,613, filed on Oct. 21, 2011, now Pat. No. 8,508,831, which is a continuation-in-part of application No. PCT/US2010/051741, filed as application No. PCT/US2010/032017 on Apr. 22, 2010.

(60) Provisional application No. 61/261,839, filed on Nov. 17, 2009, provisional application No. 61/249,300, filed on Oct. 7, 2009, provisional application No. 61/187,112, filed on Jun. 15, 2009, provisional application No. 61/172,022, filed on Apr. 23, 2009.

(51) Int. Cl.
| | |
|---|---|
| G02F 1/153 | (2006.01) |
| G02F 1/157 | (2006.01) |
| G02B 7/182 | (2021.01) |
| B24B 49/00 | (2012.01) |
| B24B 9/02 | (2006.01) |
| B24B 13/00 | (2006.01) |
| B60R 1/08 | (2006.01) |
| B24B 9/08 | (2006.01) |
| C03C 17/06 | (2006.01) |
| G02F 1/161 | (2006.01) |
| G02B 5/08 | (2006.01) |
| B24B 51/00 | (2006.01) |

(52) U.S. Cl.
CPC .............. *B24B 49/00* (2013.01); *B60R 1/086* (2013.01); *B60R 1/088* (2013.01); *B60R 1/12* (2013.01); *C03C 17/06* (2013.01); *G02B 7/182* (2013.01); *G02F 1/153* (2013.01); *G02F 1/157* (2013.01); *B24B 51/00* (2013.01); *B60R 1/1207* (2013.01); *C03C 2217/25* (2013.01); *C03C 2218/31* (2013.01); *G02B 5/08* (2013.01); *G02F 1/161* (2013.01)

(58) Field of Classification Search
CPC ........... B29B 9/08; B24B 13/00; B24B 49/00; B24B 51/00; C03C 17/06; C03C 2217/25; C03C 2218/31; G02B 7/182; G02B 5/08; G02F 1/153; G02F 1/157; G02F 1/161
USPC ........................................................ 359/267
See application file for complete search history.

(56) References Cited

U.S. PATENT DOCUMENTS

| | | |
|---|---|---|
| 2,962,933 A | 12/1960 | Hezler, Jr. |
| 3,280,701 A | 10/1966 | Donnelly et al. |
| 3,837,129 A | 9/1974 | Losell |
| 4,435,042 A | 3/1984 | Wood et al. |
| 4,436,371 A | 3/1984 | Wood et al. |
| 4,530,571 A | 7/1985 | Connor |
| 4,712,879 A | 12/1987 | Lynam et al. |
| 4,826,289 A | 5/1989 | Vandenbrink et al. |
| 4,902,108 A | 2/1990 | Byker |
| 4,948,242 A | 8/1990 | Desmond et al. |
| 5,052,163 A | 10/1991 | Czekala |
| 5,066,112 A | 11/1991 | Lynam et al. |
| 5,069,535 A | 12/1991 | Baucke et al. |
| 5,073,012 A | 12/1991 | Lynam |
| 5,076,673 A | 12/1991 | Lynam et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,151,824 A | 9/1992 | O'Farrell |
| 5,158,638 A | 10/1992 | Osanami et al. |
| 5,179,471 A | 1/1993 | Caskey et al. |
| 5,253,109 A | 10/1993 | O'Farrell et al. |
| 5,327,288 A | 7/1994 | Wellington et al. |
| 5,379,146 A | 1/1995 | Defendini |
| 5,421,940 A | 6/1995 | Cornils et al. |
| 5,448,397 A | 9/1995 | Tonar |
| 5,525,264 A | 6/1996 | Cronin et al. |
| 5,530,240 A | 6/1996 | Larson et al. |
| 5,550,677 A | 8/1996 | Schofield et al. |
| 5,552,094 A | 9/1996 | Kubota |
| 5,555,136 A | 9/1996 | Waldmann et al. |
| 5,575,552 A | 11/1996 | Faloon et al. |
| 5,582,383 A | 12/1996 | Mertens et al. |
| 5,610,756 A | 3/1997 | Lynam et al. |
| 5,649,756 A | 7/1997 | Adams et al. |
| 5,668,663 A | 9/1997 | Varaprasad et al. |
| 5,669,698 A | 9/1997 | Veldman et al. |
| 5,671,996 A | 9/1997 | Bos et al. |
| 5,680,263 A | 10/1997 | Zimmermann et al. |
| 5,724,187 A | 3/1998 | Varaprasad et al. |
| 5,790,298 A | 8/1998 | Tonar |
| 5,796,094 A | 8/1998 | Schofield et al. |
| 5,808,778 A | 9/1998 | Bauer et al. |
| 5,818,625 A | 10/1998 | Forgette et al. |
| 5,877,897 A | 3/1999 | Schofield et al. |
| 5,910,854 A | 6/1999 | Varaprasad et al. |
| 5,923,457 A | 7/1999 | Byker et al. |
| 5,984,482 A | 11/1999 | Rumsey et al. |
| 6,002,511 A | 12/1999 | Varaprasad et al. |
| 6,064,508 A | 5/2000 | Forgette et al. |
| 6,068,380 A | 5/2000 | Lynn et al. |
| 6,102,546 A | 8/2000 | Carter |
| 6,111,683 A | 8/2000 | Cammenga et al. |
| 6,124,886 A | 9/2000 | DeLine et al. |
| 6,154,306 A | 11/2000 | Varaprasad et al. |
| 6,170,956 B1 | 1/2001 | Rumsey et al. |
| 6,178,034 B1 | 1/2001 | Allemand et al. |
| 6,193,379 B1 | 2/2001 | Tonar et al. |
| 6,195,194 B1 | 2/2001 | Roberts et al. |
| 6,227,675 B1 | 5/2001 | Mertens et al. |
| 6,239,899 B1 | 5/2001 | DeVries et al. |
| 6,249,369 B1 | 6/2001 | Theiste et al. |
| 6,315,421 B1 | 11/2001 | Apfelbeck et al. |
| 6,317,248 B1 | 11/2001 | Agrawal et al. |
| 6,318,870 B1 | 11/2001 | Spooner et al. |
| 6,329,925 B1 | 12/2001 | Skiver et al. |
| 6,331,066 B1 | 12/2001 | Desmond et al. |
| 6,369,804 B1 | 4/2002 | Sandbach |
| 6,396,397 B1 | 5/2002 | Bos et al. |
| 6,407,468 B1 | 6/2002 | LeVesque et al. |
| 6,407,847 B1 | 6/2002 | Poll et al. |
| 6,439,755 B1 | 8/2002 | Fant, Jr. et al. |
| 6,452,479 B1 | 9/2002 | Sandbach |
| 6,499,850 B2 | 12/2002 | Waldmann |
| 6,502,970 B1 | 1/2003 | Anderson et al. |
| 6,535,126 B2 | 3/2003 | Lin et al. |
| 6,598,980 B2 | 7/2003 | Marusawa et al. |
| 6,606,183 B2 | 8/2003 | Ikai et al. |
| 6,614,579 B2 | 9/2003 | Roberts et al. |
| 6,619,955 B2 | 9/2003 | Cardarelli |
| 6,650,457 B2 | 11/2003 | Busscher et al. |
| 6,690,268 B2 | 2/2004 | Schofield et al. |
| D493,131 S | 7/2004 | Lawlor et al. |
| D493,394 S | 7/2004 | Lawlor et al. |

(56) References Cited

U.S. PATENT DOCUMENTS

| | | | |
|---|---|---|---|
| 6,774,810 B2 | 8/2004 | DeLine et al. | |
| 6,781,738 B2 | 8/2004 | Kikuchi et al. | |
| 6,870,656 B2 | 3/2005 | Fonar et al. | |
| 7,004,593 B2 | 2/2006 | Weller et al. | |
| 7,012,729 B2 | 3/2006 | Tonazzi et al. | |
| 7,042,616 B2 | 5/2006 | Tonar et al. | |
| 7,064,882 B2 | 6/2006 | Tonar et al. | |
| 7,093,965 B2 | 8/2006 | Veldman | |
| 7,110,156 B2 | 9/2006 | Lawlor et al. | |
| 7,184,190 B2 | 2/2007 | McCabe et al. | |
| 7,195,381 B2 | 3/2007 | Lynam et al. | |
| 7,224,324 B2 | 5/2007 | Quist et al. | |
| 7,249,860 B2 | 7/2007 | Kulas et al. | |
| 7,253,723 B2 | 8/2007 | Lindahl et al. | |
| 7,255,451 B2 * | 8/2007 | McCabe | G02F 1/157 |
| | | | 359/605 |
| 7,274,501 B2 | 9/2007 | McCabe et al. | |
| 7,287,868 B2 | 10/2007 | Carter et al. | |
| 7,289,037 B2 | 10/2007 | Uken et al. | |
| 7,324,261 B2 * | 1/2008 | Tonar | G02F 1/1503 |
| | | | 359/267 |
| 7,338,177 B2 * | 3/2008 | Lynam | B60R 1/12 |
| | | | 359/872 |
| 7,360,932 B2 | 4/2008 | Uken et al. | |
| 7,370,983 B2 | 5/2008 | DeWind et al. | |
| 7,372,611 B2 | 5/2008 | Tonar et al. | |
| 7,420,756 B2 | 9/2008 | Lynam | |
| 7,510,311 B2 | 3/2009 | Romas et al. | |
| 7,526,367 B2 | 4/2009 | Schofield et al. | |
| 7,532,149 B2 | 5/2009 | Banko et al. | |
| 7,542,193 B2 | 6/2009 | McCabe et al. | |
| 7,570,413 B2 | 8/2009 | Tonar et al. | |
| 7,599,108 B2 | 10/2009 | Lawlor et al. | |
| 7,602,542 B2 | 10/2009 | Tonar et al. | |
| 7,612,929 B2 | 11/2009 | Tonar et al. | |
| 7,626,749 B2 | 12/2009 | Baur et al. | |
| 7,706,046 B2 | 4/2010 | Bauer et al. | |
| 7,710,631 B2 | 5/2010 | McCabe et al. | |
| 7,719,750 B2 | 5/2010 | Tonar et al. | |
| 7,817,020 B2 | 10/2010 | Turnbull et al. | |
| 7,821,697 B2 | 10/2010 | Varaprasad et al. | |
| 7,826,123 B2 | 11/2010 | McCabe et al. | |
| 7,855,755 B2 | 12/2010 | Weller et al. | |
| 7,864,399 B2 | 1/2011 | McCabe et al. | |
| D633,019 S | 2/2011 | De Wind | |
| D633,423 S | 3/2011 | De Wind | |
| 7,926,960 B2 | 4/2011 | Skiver et al. | |
| D638,761 S | 5/2011 | De Wind | |
| 7,978,094 B2 | 7/2011 | Uken et al. | |
| 7,980,711 B2 | 7/2011 | Takayanagi et al. | |
| 3,004,741 A1 | 8/2011 | Tonar et al. | |
| 8,018,440 B2 | 9/2011 | Townsend et al. | |
| D647,017 S | 10/2011 | De Wind | |
| 8,047,667 B2 | 11/2011 | Weller et al. | |
| 8,048,085 B2 | 11/2011 | Peterson et al. | |
| 8,049,640 B2 | 11/2011 | Uken et al. | |
| 8,154,418 B2 | 4/2012 | Peterson et al. | |
| D660,208 S | 5/2012 | De Wind | |
| 8,169,684 B2 | 5/2012 | Bugno et al. | |
| 8,179,586 B2 | 5/2012 | Schofield et al. | |
| D661,234 S | 6/2012 | De Wind | |
| 8,194,133 B2 | 6/2012 | DeWind et al. | |
| 8,237,909 B2 | 8/2012 | Dstreko et al. | |
| 8,277,059 B2 | 10/2012 | McCabe et al. | |
| 8,339,526 B2 | 12/2012 | Minikey, Jr. et al. | |
| 8,465,161 B2 | 6/2013 | DeWind et al. | |
| 8,508,831 B2 | 8/2013 | De Wind et al. | |
| 8,730,553 B2 | 5/2014 | De Wind et al. | |
| 8,976,439 B2 | 3/2015 | De Wind et al. | |
| 9,481,303 B2 * | 11/2016 | De Wind | B24B 9/08 |
| 9,545,882 B2 | 1/2017 | Lock et al. | |
| 9,783,115 B2 | 10/2017 | Uken et al. | |
| 10,189,407 B2 | 1/2019 | De Wind et al. | |
| 10,632,921 B2 | 4/2020 | De Wind et al. | |
| 2002/0057494 A1 | 5/2002 | Lang | |
| 2003/0007261 A1 | 1/2003 | Hutzel et al. | |
| 2005/0281043 A1 | 12/2005 | Eisenbraun | |
| 2006/0050018 A1 | 3/2006 | Hutzel et al. | |
| 2006/0061008 A1 | 3/2006 | Kamer et al. | |
| 2007/0081350 A1 | 4/2007 | Huang | |
| 2007/0139751 A1 | 6/2007 | Kuiper et al. | |
| 2008/0042938 A1 | 2/2008 | Cok | |
| 2009/0213480 A1 | 8/2009 | Li | |
| 2009/0237821 A1 | 9/2009 | Li | |
| 2009/0243824 A1 | 10/2009 | Peterson et al. | |
| 2009/0251785 A1 | 10/2009 | Bruhnke et al. | |
| 2009/0251913 A1 | 10/2009 | Bruhnke et al. | |
| 2010/0290141 A1 | 11/2010 | Huang | |
| 2010/0321758 A1 | 12/2010 | Bugno et al. | |
| 2011/0176323 A1 | 7/2011 | Skiver et al. | |
| 2011/0317242 A1 | 12/2011 | Tonar et al. | |
| 2012/0026571 A1 | 2/2012 | Uken et al. | |
| 2012/0038964 A1 | 2/2012 | De Wind et al. | |
| 2012/0236388 A1 | 9/2012 | De Wind et al. | |

FOREIGN PATENT DOCUMENTS

| | | |
|---|---|---|
| DE | 3049169 A1 | 7/1982 |
| EP | 0744321 A2 | 11/1996 |
| EP | 1103420 A2 | 5/2001 |
| EP | 1345071 A1 | 9/2003 |
| EP | 2106970 A1 | 10/2009 |
| FR | 1525709 A | 5/1968 |
| WO | 2001001192 A1 | 1/2001 |
| WO | 2003004245 A1 | 1/2003 |
| WO | 2004026633 A2 | 4/2004 |
| WO | 2004031840 A2 | 4/2004 |
| WO | 2004042457 A2 | 5/2004 |
| WO | 2005096069 A1 | 10/2005 |
| WO | 2008013499 A1 | 1/2008 |
| WO | 2010124064 A1 | 10/2010 |
| WO | 2011044312 A1 | 4/2011 |
| WO | 2012/051500 A1 | 4/2012 |
| WO | 2013071070 A1 | 5/2013 |

OTHER PUBLICATIONS

Chinese Office Action dated Apr. 18, 2013 from CN Application No. 201080028490.6.

* cited by examiner

METHOD OF MAKING A MIRROR SUBSTRATE FOR A VEHICULAR REARVIEW MIRROR ASSEMBLY

CROSS REFERENCE TO RELATED APPLICATIONS

The present application is a continuation of U.S. patent application Ser. No. 16/258,789, filed Jan. 28, 2019, now U.S. Pat. No. 10,632,921, which is a continuation of U.S. patent application Ser. No. 15/338,779, filed Oct. 31, 2016, now U.S. Pat. No. 10,189,407, which is a continuation of U.S. patent application Ser. No. 14/641,813, filed Mar. 9, 2015, now U.S. Pat. No. 9,481,303, which is a continuation of U.S. patent application Ser. No. 13/964,136, filed Aug. 12, 2013, now U.S. Pat. No. 8,976,439, which is a continuation of U.S. patent application Ser. No. 13/265,613, filed Oct. 21, 2011, now U.S. Pat. No. 8,508,831, which is a 371 national phase application of PCT Application No. PCT/US2010/032017, filed Apr. 22, 2010, which claims the benefit of U.S. provisional applications, Ser. No. 61/187,112, filed Jun. 15, 2009, and Ser. No. 61/172,022, filed Apr. 23, 2009, which are hereby incorporated herein by reference in their entireties. And U.S. patent application Ser. No. 13/265,613 is a continuation-in-part of PCT Application No. PCT/US2010/051741, filed Oct. 7, 2010, which claims the benefit of U.S. provisional applications, Ser. No. 61/261,839, filed Nov. 17, 2009, and Ser. No. 61/249,300, filed Oct. 7, 2009.

FIELD OF THE INVENTION

The present invention relates generally to the field of rearview mirror assemblies for vehicles and, more particularly, to an interior rearview mirror assembly that is adjustably mounted to an interior portion of a vehicle.

BACKGROUND OF THE INVENTION

Typically, a prismatic interior rearview mirror assembly includes a mirror reflective element that is attached to an attachment plate and at least partially received in a casing, with a bezel portion snapped to the casing so that the bezel portion and casing overlap or encompass a perimeter edge of the reflective element and a portion or perimeter region of an outer or front surface of the reflective element (the surface facing the driver of the vehicle when the mirror assembly is normally mounted in the vehicle). The reflective element is adjustable by the driver to adjust the rearward field of view provided by the mirror reflective element.

SUMMARY OF THE INVENTION

The present invention provides a rearview mirror assembly that includes a casing and a reflective element attached to or adhered to a surface or portion of the casing with no bezel portion overlapping or encompassing a perimeter edge or front surface of the reflective element. The reflective element may comprise a prismatic or wedge-shaped reflective element and the perimeter edge of the reflective element may be rounded or ground or polished so as to provide a rounded profile or curved transition around the perimeter of the reflective element.

According to an aspect of the present invention, a rearview mirror assembly for a vehicle comprises a casing and a reflective element. The reflective element comprises a front surface (the surface that generally faces the driver of the vehicle when the mirror assembly is normally mounted in the vehicle) and a rear surface opposite the front surface. The rear surface has a reflective mirror reflector coated or established thereat. The rear surface of the reflective element is attached, such as adhered, to a mounting surface or portion of the casing. When the reflective element is attached to the mounting surface of the casing, the perimeter edge of the reflective element is exposed and the casing does not extend over or encompass the perimeter edge or the front surface of the reflective element.

Optionally, the perimeter edge may be rounded at a front surface (such as via grinding and/or polishing the edge region of the mirror substrate) so as to provide a rounded front edge portion (that is viewable by the driver of the vehicle). The rounded perimeter edge may be tapered to provide a smooth curved transition between the front surface of the reflective element and a rear portion of the perimeter edge of the reflective element and the outer side walls of the mirror casing. The rounded perimeter edge may be polished or otherwise finished to provide a smooth aesthetically pleasing perimeter edge of the reflective element.

These and other objects, advantages, purposes and features of the present invention will become apparent upon review of the following specification in conjunction with the drawings.

DESCRIPTION OF THE PREFERRED EMBODIMENTS

Figure 1:
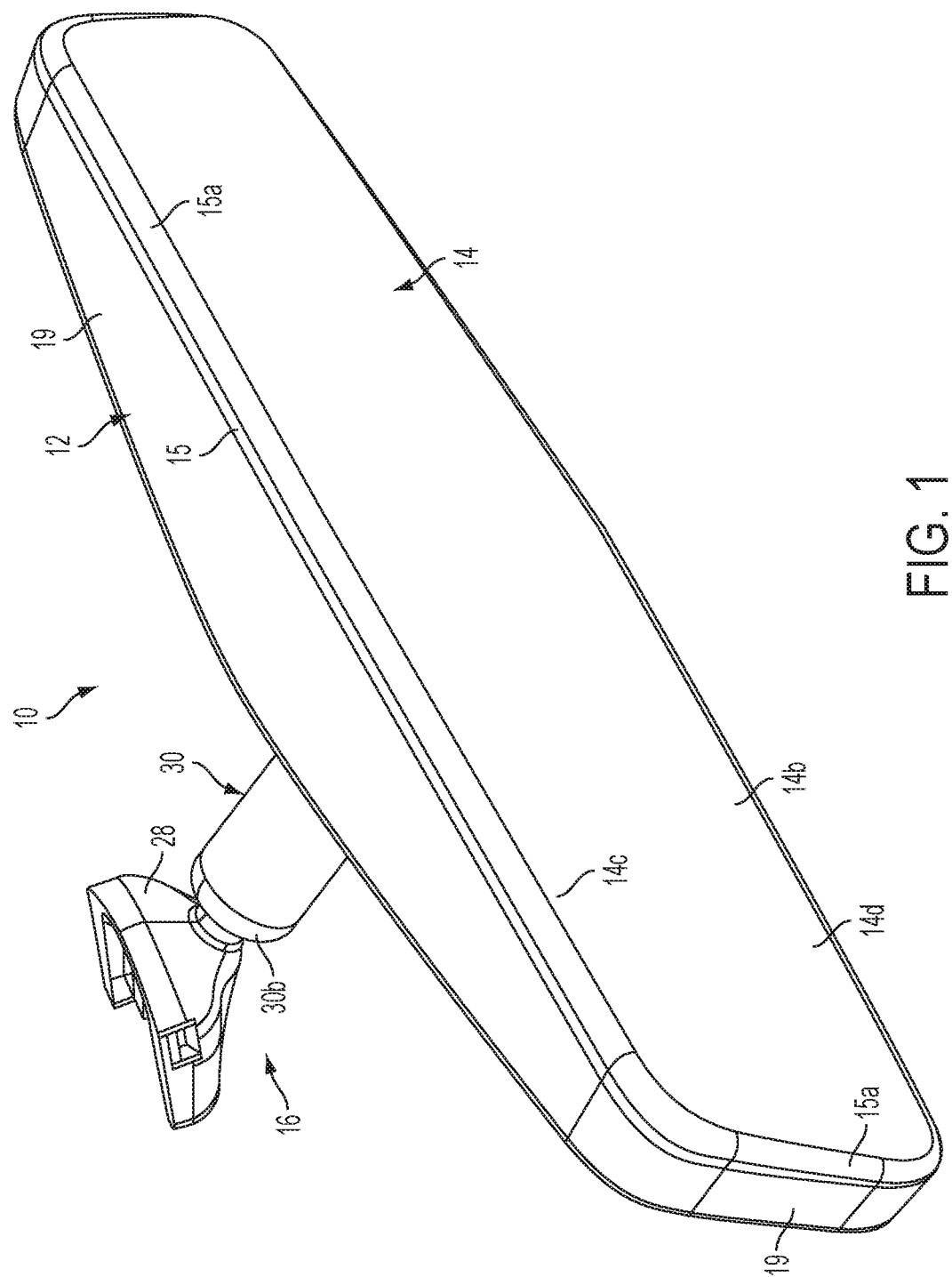
FIG. 1 is a front perspective view of an interior rearview mirror assembly in accordance with the present invention.

Referring now to the drawings and the illustrative embodiments depicted therein, a rearview mirror assembly 10 for a vehicle includes a casing 12 and a reflective element 14 positioned at a front portion of the casing 12 (FIGS. 1-6). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror casing 12 includes a front mounting surface or panel or substrate 18 (FIGS. 3 and 5) to which a rear surface 14a of the reflective element is attached, such as via an adhesive or adhesive tape 20 (FIGS. 3 and 4) or the like. When so attached or adhered, the perimeter edges of the mirror substrate or reflective element are flush with or generally co-planar with the outer surfaces of the sidewalls of the mirror casing, as discussed below. The reflective element 14 thus is attached to the casing and the mirror assembly does not include a bezel or casing portion that encompasses a front surface 14b and a perimeter edge 15 of the reflective element 14, as also discussed below.

Figure 5:
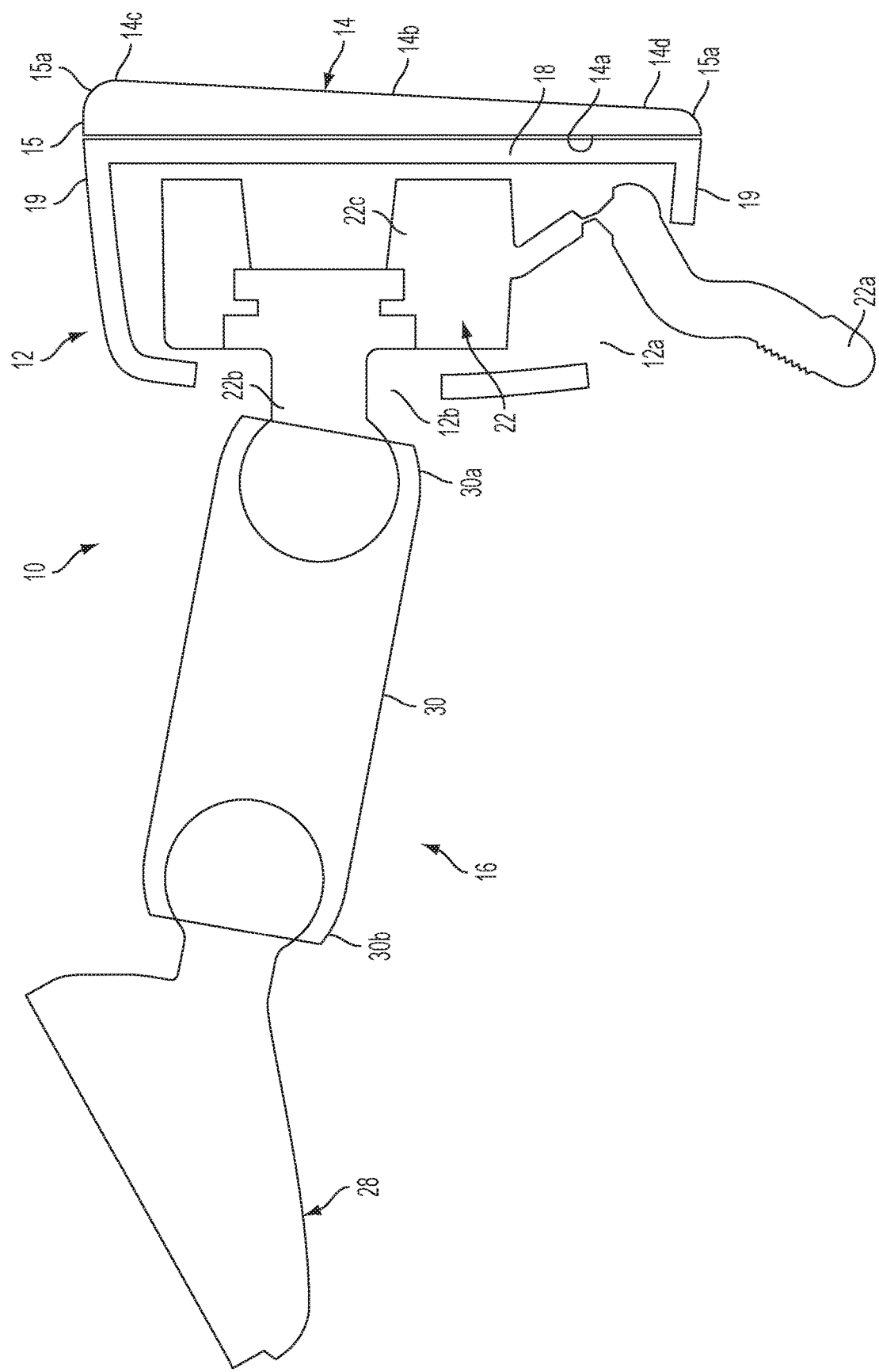
FIG. 5 is a side elevation and partial sectional view of the interior rearview mirror assembly of FIGS. 1 and 2.
Figure 6:
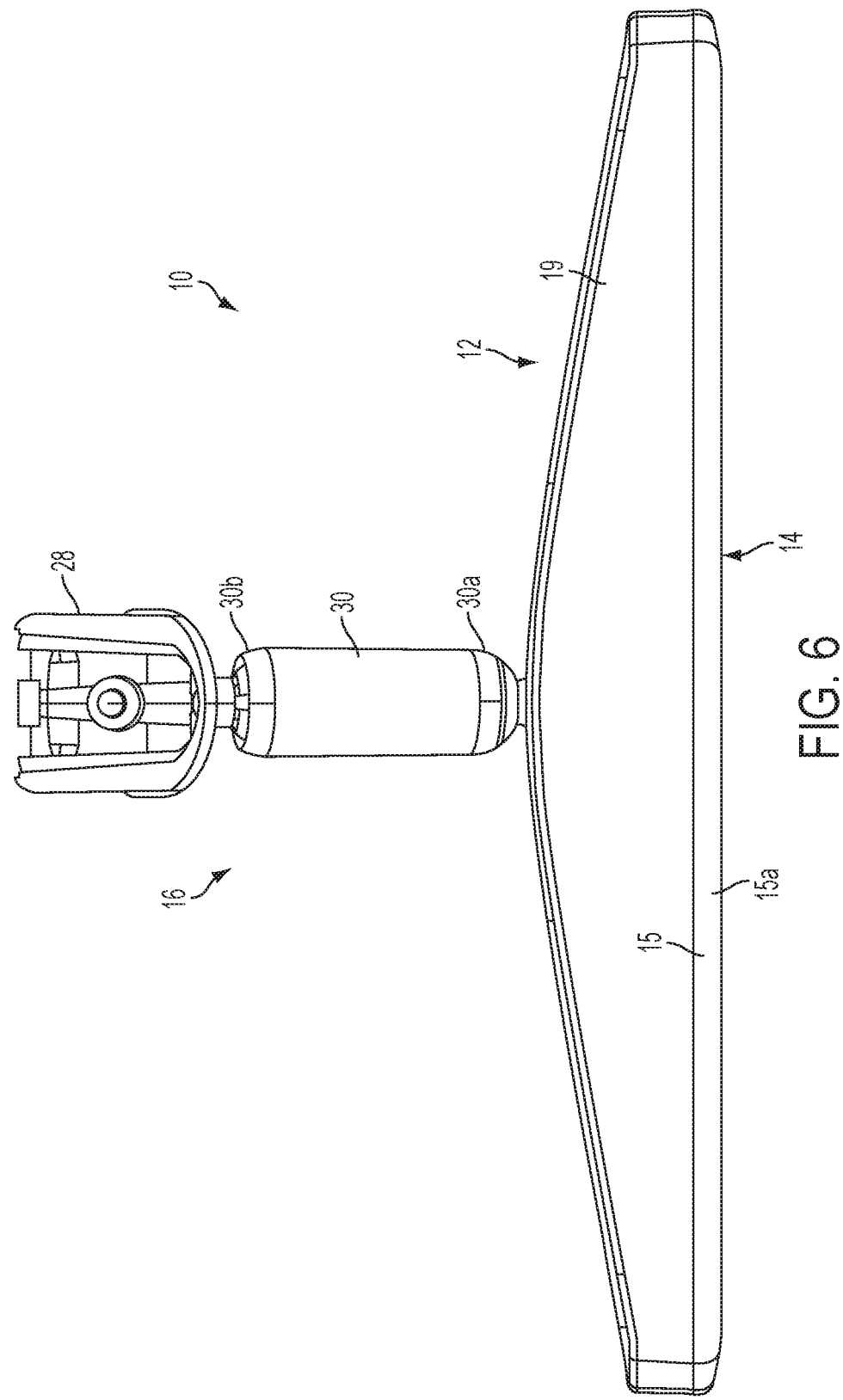
FIG. 6 is an upper plan view of the interior rearview mirror assembly of FIGS. 1, 2 and 5.
Figure 7:
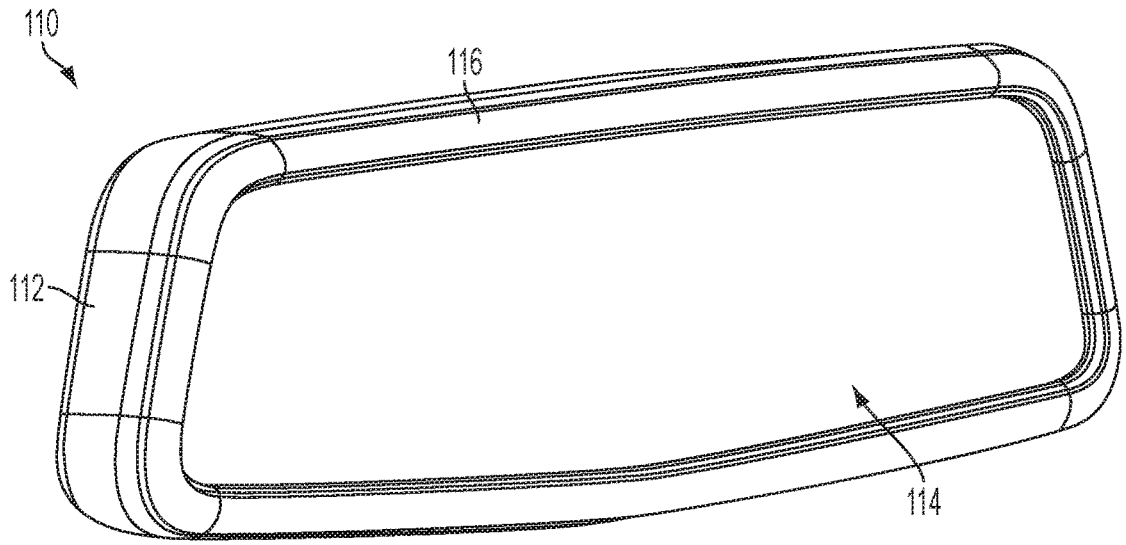
FIG. 7 is a front perspective view of an interior rearview mirror assembly in accordance with the present invention.

Reflective element 14 comprises a prismatic or wedge-shaped reflective element having rear surface 14a and front surface 14b (the surface that generally faces the driver of a vehicle when the mirror assembly is normally mounted in the vehicle) with perimeter edge 15 disposed or established about the perimeter of the reflective element and between the front and rear surfaces. Mirror reflective element 14 may be formed from various materials such as plastic or glass, but preferably is glass, and preferably has a planar front surface extending at an angle to a planar rear surface. For example, and as best shown in FIG. 5, the wedge-shaped reflective element 14 has a thicker upper region 14c and a thinner lower region 14d. A mirror reflector, such as a reflective coating or layer of a metallic material or composition, such as, for example, a layer or layers of chromium, aluminum or alloys thereof, such as may be conventionally known in the industry, is disposed or coated or established on rear surface 14a of reflective element 14.

In the illustrated embodiment, reflective element 14 has a forward edge portion 15a of perimeter edge 15 rounded to provide a smooth curved transition between the perimeter region of front surface 14b and perimeter edge 15 and mirror casing 12. As can be seen in FIG. 5, the upper perimeter edge region has a smooth curved transition from front surface 14b to the upper perimeter edge or surface via curved or rounded forward edge portion 15a, while the lower perimeter edge region has a smooth curved transition from front surface 14b to the lower wall or surface of the mirror casing 12 via the curved or rounded forward edge portion 15a. The radius of curvature of the forward edge portion 15a may be selected so as to provide a desired appearance and a transition to the perimeter edge and/or the mirror casing around the entire periphery of the reflective element. In the illustrated embodiment, the radius of curvature is about 2.5 mm or about 3 mm, but may be greater than or less than this dimension depending on the particular application of the reflective element and mirror casing of the mirror assembly. Typically, it is desired to have at least about a 2.5 mm radius of curvature at the perimeter edges of a mirror assembly (typically at a bezel of a conventional mirror assembly) to meet the minimum safety standards for head impact with the mirror, such as during a sudden stop or collision of the equipped vehicle.

In the illustrated embodiment, the radius of curvature is substantially uniform around the perimeter of the reflective element. Optionally, however, the radius of curvature of the curved perimeter edge may vary or be non-uniform around the perimeter of the reflective element substrate, while remaining within the spirit and scope of the present invention. For example, the radius of curvature along the lower, thinner perimeter region of the substrate may be smaller than the radius of curvature along the upper, thicker perimeter region of the substrate, with the radius of curvature along the side perimeter regions varying to provide a substantially smooth transition between the smaller radius of curvature at the bottom of the reflective element and the larger radius of curvature at the top of the reflective element. Such a varying or non-uniform radius of curvature configuration may be suitable for a plastic reflective element, where the plastic substrate may be molded to provide any desired profile along the perimeter edges of the substrate. Optionally, the reflective element may comprise any suitable or selected or desired profile around the perimeter edges, such as, for example, curved or rounded edges or substantially flat edges or chamfered edges or edges with a decorative profile or the like (and the formed edges may be established during molding of a plastic substrate or may be established by grinding or polishing or otherwise shaping a glass substrate, such as discussed below), while remaining within the spirit and scope of the present invention.

The reflective element is pivoted or adjusted or toggled via a toggle device 22 (FIG. 5) that is adjustable by a user to adjust the mirror reflective element between a day state orientation or higher reflectivity orientation (where the reflective element is adjusted or set to reflect a greater percentage of light incident thereon toward the driver of the vehicle) and a night state orientation or lower reflectivity orientation (where the reflective element is adjusted or set to reflect a lower percentage of light incident thereon toward the driver of the vehicle), as also discussed below. The toggle device or element 22 may comprise any suitable toggle device, such as a toggle device of the types described in U.S. Pat. Nos. 6,318,870 and/or 7,249,860, and/or U.S. patent application Ser. No. 12/558,892 (now abandoned), filed Sep. 14, 2009 and published Apr. 8, 2010 as U.S. Publication No. US-2010-0085653, which are hereby incorporated herein by reference in their entireties. In the illustrated embodiment, the toggle device 22 includes a toggle element or flip element or tab 22a extending downward from a body portion 22c and a ball member 22b extending rearward from the body portion 22c. The toggle body 22c is received within central cavity 24 of mirror casing 12 and may be secured or attached or mounted at central cavity 24 of mirror casing 12, such as via snapping the toggle device 22 to snap elements or attachment elements formed or molded at central cavity 24 of mirror casing 12. Thus, when the tab 22a is flipped by the user, the body portion 22c may flex to pivot the mirror casing and reflective element about a generally horizontal pivot axis and relative to the ball member 22b and mounting structure 16 to adjust the mirror reflective element between a daytime orientation and nighttime orientation, such as in a known manner.

Mirror casing 12 and reflective element 14 thus are pivotable relative to the mirror mounting assembly 16 to pivot the reflective surface of reflective element 14 in order to reduce glare during nighttime conditions. When mirror assembly 10 is pivoted from a full reflectivity day position to a reduced reflectivity night position, the reflective surface of reflective element 14 is rotated or pivoted or adjusted such that uncoated front surface of the reflective element is aligned for viewing by the vehicle driver instead of rear reflective surface of the reflective element 14. The rear reflective surface may reflect at least about 60 percent to about 95 percent of the light incident thereon, while the uncoated front surface may reflect about 4 percent or thereabouts of the light incident thereon, thereby significantly reducing glare from headlights or other bright lights to the rear of the vehicle to the driver's eyes. Optionally, however, it is envisioned that the reflective element may comprise a flat or generally planar substrate or non-prismatic substrate or slightly curved substrate, and optionally without any day/night adjustment, and without any bezel or casing portion encompassing the perimeter edge and front surface of the reflective element substrate, while remaining within the spirit and scope of the present invention.

Figure 2:
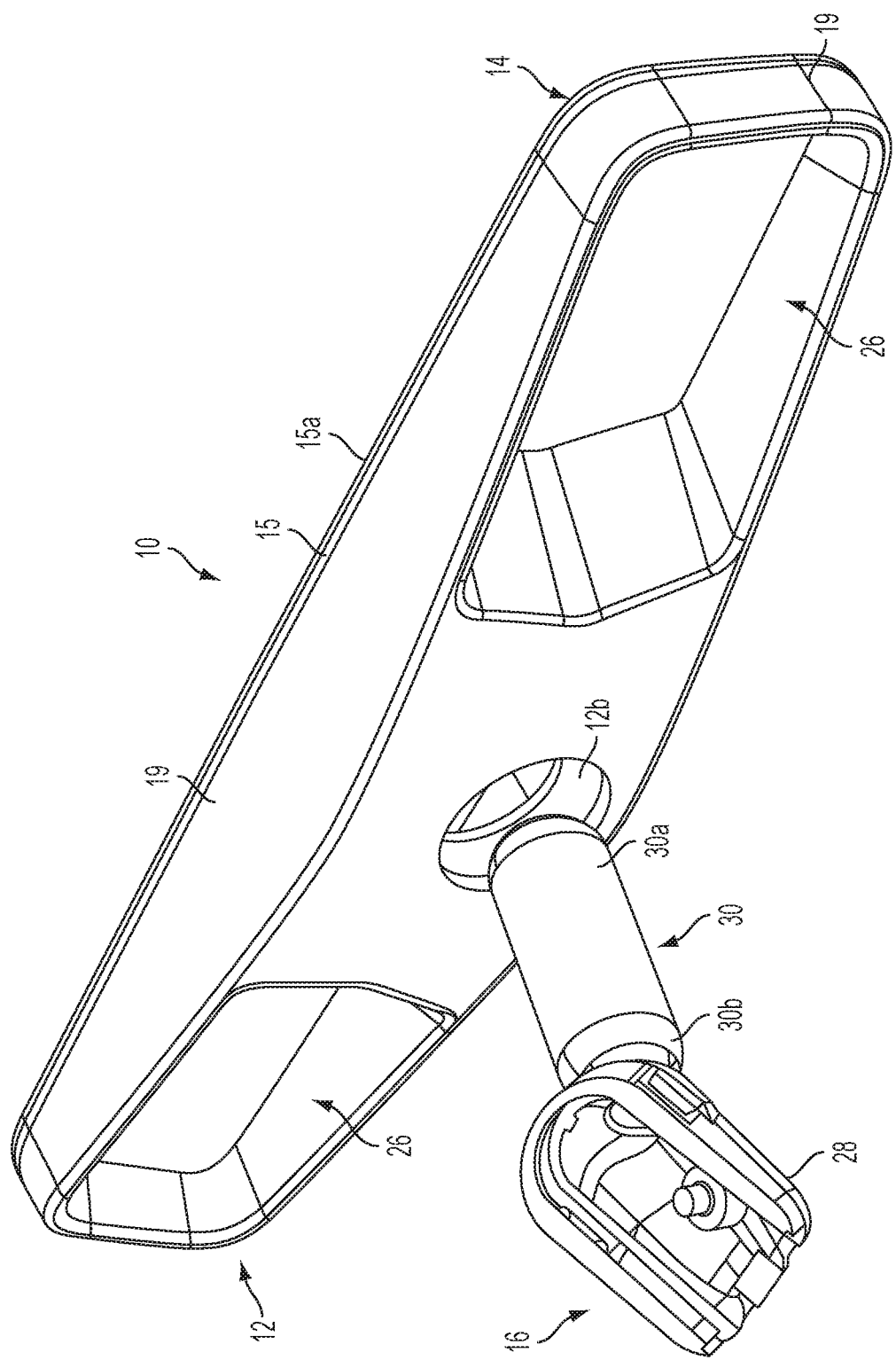
FIG. 2 is a rear perspective view of the interior rearview mirror assembly of FIG. 1.
Figure 3:
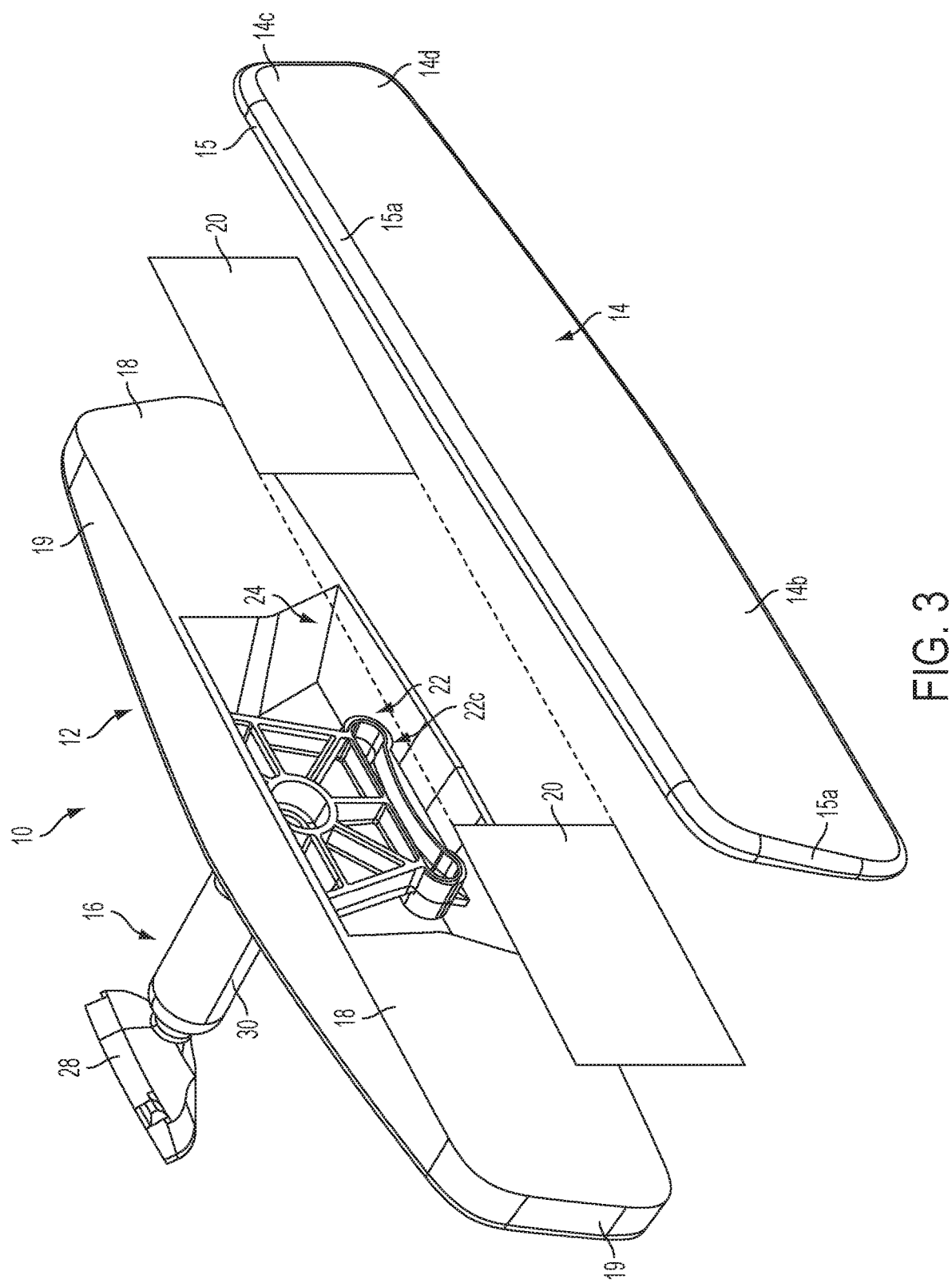
FIG. 3 is a front exploded perspective view of the interior rearview mirror assembly of FIGS. 1 and 2.
Figure 4:
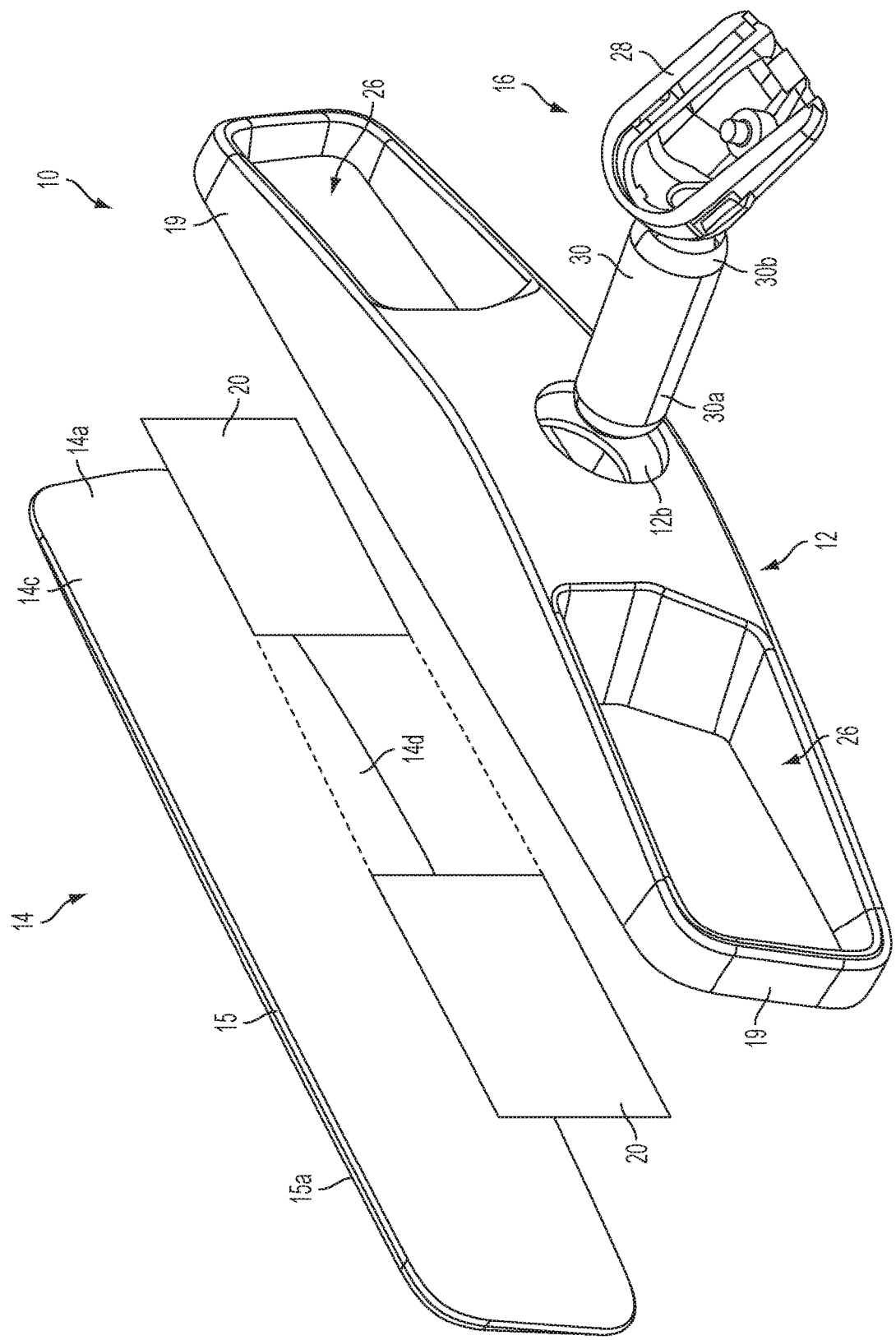
FIG. 4 is a rear exploded perspective view of the interior rearview mirror assembly of FIGS. 1 and 2.

Mirror casing 12 comprises a plastic or polymeric molded casing having at least one generally planar front attachment surface or panel or wall 18 and upper, lower and side walls or outer surfaces 19 around the periphery of the mirror casing. In the illustrated embodiment, and as shown in FIG. 3, the mirror casing 12 is formed with two spaced apart attachment panels or surfaces 18, with the central region of the casing having a central cavity 24 that is open or vacant for receiving the toggle device 22 therein. As shown in FIGS. 2 and 4, the rear portion of the casing 12 may have recesses 26 formed therein. Such recesses 26 are formed during the molding of mirror casing so that mirror casing 12 may be unitarily molded (such as via injection molding), whereby the central cavity 24 is established to be open at the front portion of the mirror casing and the recesses 26 are open at the rear portion of the mirror casing. The recesses may be closed or covered via a cap portion or cover element (not shown) or the like, and such cap portions or cover elements may include or encase or house or cover one or more accessories (such as, for example, compass components or circuitry and/or garage door opener components or circuitry or any other electronic accessory or content desired for the particular mirror application), such as by utilizing aspects of the mirror assemblies described in U.S. Pat. No. 7,289,037, which is hereby incorporated herein by reference in its entirety. For example, a cover element may be snapped to the mirror casing or otherwise attached (such as via adhesive or fasteners or the like) at the mirror casing and at one of the rear recesses of the mirror casing to cover the recesses to provide a desired appearance at the rear of the mirror casing and/or to encase or support or house one or more electrical or non-electrical accessories or mirror content at the rear of the mirror casing.

Optionally, the mirror casing may be otherwise formed with a central cavity and generally planar attachment panels or surfaces or wings. For example, the mirror casing may include the center portion and central cavity and side panels or wings, but without the rear recesses and side walls and upper and lower walls around the perimeter of the side panels. Optionally, the mirror casing may comprise an injected molded plastic or polymeric casing, or may comprise a stamped metallic casing or may be an otherwise formed plastic or polymeric or metallic casing, while remaining within the spirit and scope of the present invention.

The reflective element 14 thus may be readily attached to the front surfaces 18 of the mirror casing 12. In the illustrated embodiment, and as shown in FIGS. 3 and 4, the reflective element 14 is attached via an adhesive tape 20, such as a double-sided adhesive tape disposed between the rear surface 14a of reflective element 14 and the front surface 18 of mirror casing 12. The tape may be disposed at each of the panel portions or attachment surfaces of the mirror casing or may extend across the entire width or substantially the entire width of the reflective element (such as shown in phantom in FIGS. 3 and 4), and the adhesive tape may function as an anti-scatter barrier or element at the rear of the reflective element. The reflective element 14 thus may be fixedly attached to the mirror casing 12 and may be pivoted with the mirror casing 12 relative to the mounting assembly 16 to adjust the rearward field of view to the driver of the vehicle. When the reflective element 14 is attached to the attachment surfaces 18 of mirror casing 12, the perimeter edges or regions of the reflective element are generally flush or co-planar with the respective outer walls or surfaces 19 of the mirror casing 12.

Although shown and described as being adhesively attached to the attachment surfaces of the mirror casing, it is envisioned that the reflective element may be otherwise attached to the mirror casing, while remaining within the spirit and scope of the present invention. For example, the reflective element may include or may be adhered to a back plate structure that includes attachment elements for connecting to corresponding attachment elements of the mirror casing. For example, the back plate may include flexible tabs extending therefrom that flex to engage and snap to corresponding slots and tabs at the mirror casing to secure the reflective element to the mirror casing. The reflective element thus may be attached to the mirror casing via other suitable attachment means while the mirror casing does not encompass or overlap the perimeter edge and/or the perimeter region of the front surface of the reflective element.

In the illustrated embodiment, mounting assembly 16 comprises a double-ball or double-pivot mounting assembly whereby the reflective element and casing are adjustable relative to the vehicle windshield (or other interior portion of the vehicle) about two pivot joints. Mounting assembly 16 includes a base portion or mounting base 28 and a mounting arm 30, with the reflective element 14 and mirror casing 12 pivotally mounted at an outer or rearward or mirror or socket end 30a of mounting arm 30 about a first or mirror ball pivot joint (such as a ball and socket joint or the like that allows for a driver of the vehicle to which mirror assembly 10 is mounted to adjust the reflective element vertically and horizontally to adjust the rearward field of view of the driver). The opposite or forward or base end 30b of mounting arm 30 is adjustably mounted to mounting base 28 about a second or adjustable or base joint.

In the illustrated embodiment, mounting base 28 is attached to an interior or in-cabin surface of a vehicle windshield (such as to a mounting button or attachment element adhered to the in-cabin surface of the vehicle windshield). The mounting base may be mounted to a mounting button or attachment element at the vehicle windshield via a breakaway mounting construction, such as by utilizing aspects of the mounting constructions described in U.S. Pat. Nos. 5,820,097 and/or 5,100,095, which are hereby incorporated herein by reference in their entireties. Mounting arm 28 may comprise a metallic arm or a molded (such as injection molded) polymeric mounting arm or may be otherwise formed of other materials, depending on the particular application of the mirror assembly (and the mounting assembly may utilize aspects of the mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. patent application Ser. No. 11/226,628 (now abandoned), filed Sep. 14, 2005, and published Mar. 23, 2006 as U.S. Patent Publication No. US 2006/0061008, and/or PCT Application No. PCT/US2010/028130, filed Mar. 22, 2010, which published Sep. 30, 2010 as International Publication No. WO 2010/111173, which are hereby incorporated herein by reference in their entireties).

Thus, the mirror casing 12 may be molded (such as via injection molding) and the toggle assembly 22 may be inserted into or received in the central cavity 24, with its toggle element or flip element or tab 22a inserted through an opening or aperture 12a formed at a lower region of mirror casing 12, and with its ball member 22b inserted through an opening or aperture 12b at a rear portion of mirror casing 12 (such as can be seen with reference to FIG. 5). The toggle body 22c of toggle device 22 may be secured or attached or mounted at central cavity 24 of mirror casing 12, such as via snapping the body portion 22c of toggle device 22 to snap elements or attachment elements formed or molded at central cavity 24 of mirror casing 12. The mounting arm 30 may then attach to ball member 22b to attach the mirror casing 12 and reflective element 14 to the mounting structure 16.

Optionally, and with reference to FIGS. 13-17, a mirror assembly 10' may have a casing 12' and a bezeless reflective element 14' positioned at a front portion of the casing 12'. Mirror assembly 10' is adjustably mounted to an interior portion of a vehicle (such as to an interior or in-cabin surface of a vehicle windshield or a headliner of a vehicle or the like) via a mounting structure or mounting configuration or assembly (not shown in FIGS. 13-17), such as in a similar manner as discussed above. The mirror casing 12' includes a front mounting surface or panel or substrate 18' (FIGS. 13 and 14) to which a rear surface of the reflective element 14' is attached, such as via an adhesive or adhesive tape 20' (FIG. 13) or the like. When so attached or adhered, the perimeter edges of the mirror substrate or reflective element are flush with or generally co-planar with the outer surfaces of the sidewalls of the mirror casing, such as in a similar manner as discussed above with respect to mirror assembly 10.

In the illustrated embodiment, mirror casing 12' comprises a plastic or polymeric molded casing having at least one generally planar front attachment surface or panel or wall 18' and upper, lower and side walls or outer surfaces 19' around the periphery of the mirror casing. Similar to mirror casing 12, discussed above, mirror casing 12' is formed with two spaced apart attachment panels or surfaces 18', with the central region of the casing having a central cavity 24' that is open or vacant for receiving the toggle device 22' therein, and the rear portion of the casing 12' may have recesses 26' formed therein (FIGS. 15 and 16), which optionally may be closed or covered via a cap portion or cover element (not shown) or the like as discussed above.

Figure 13:
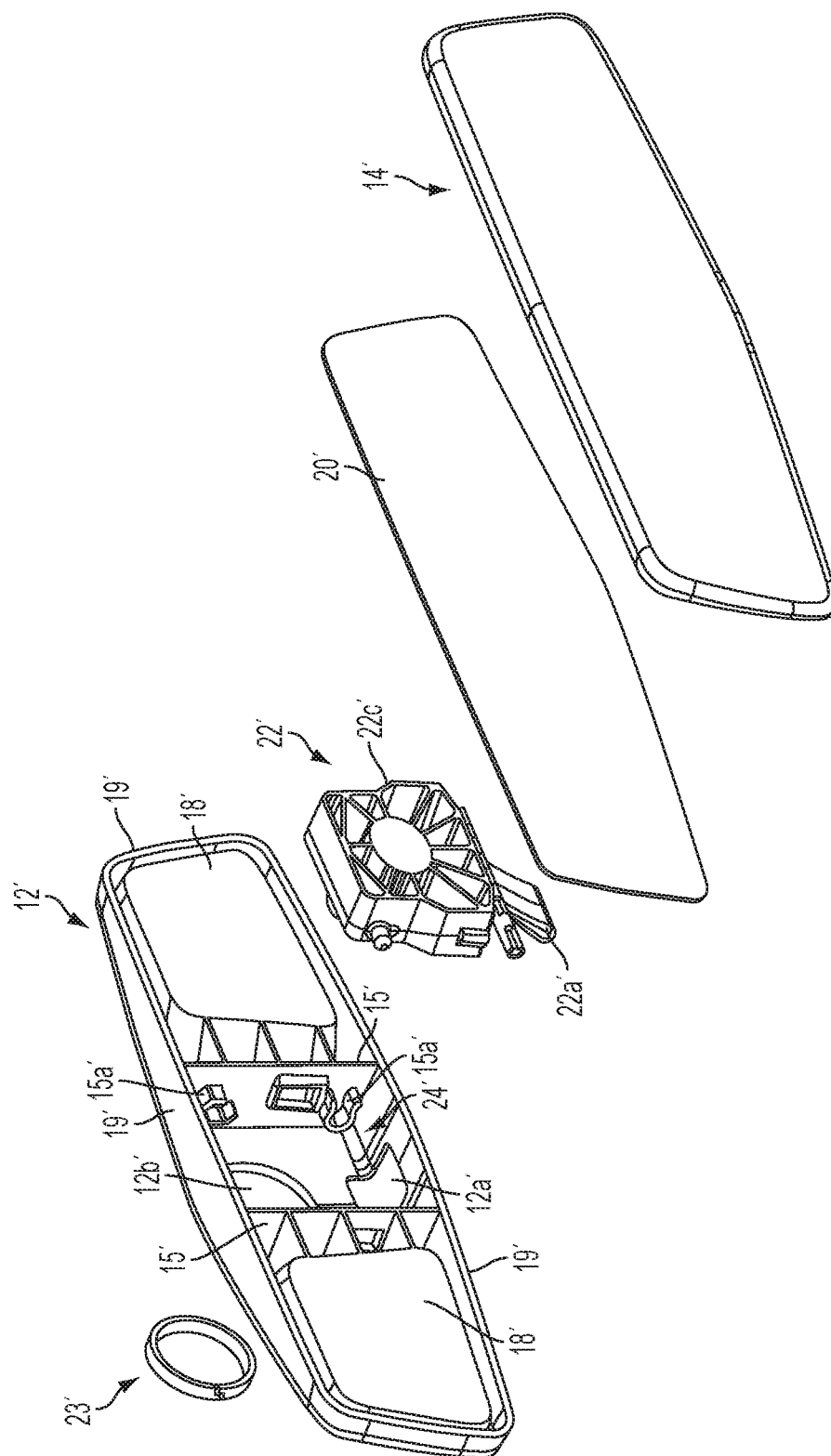
FIG. 13 is an exploded perspective view of another mirror assembly in accordance with the present invention.
Figure 14:
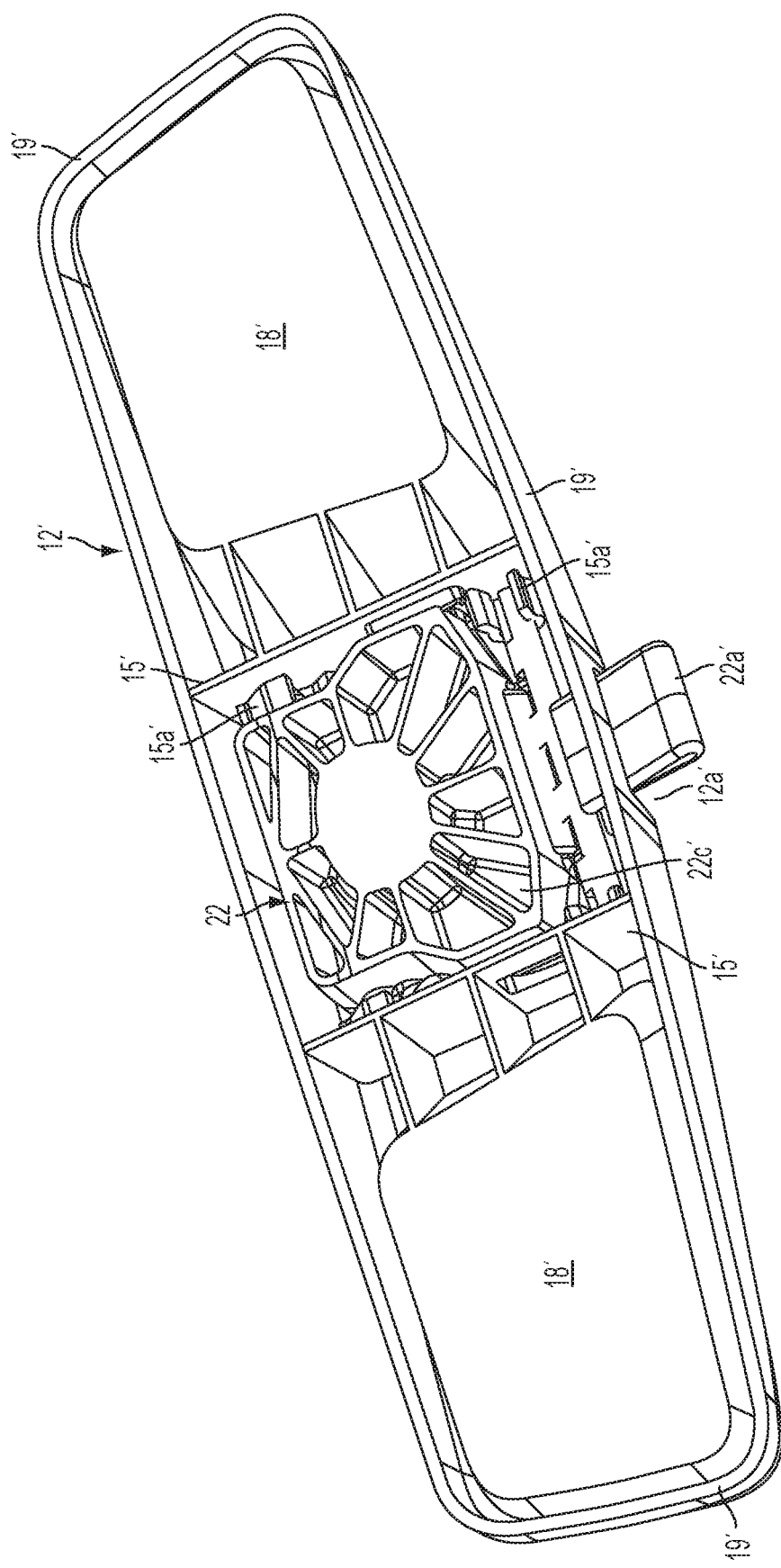
FIG. 14 is a perspective view of the mirror casing of the mirror assembly of FIG. 13.
Figure 15:
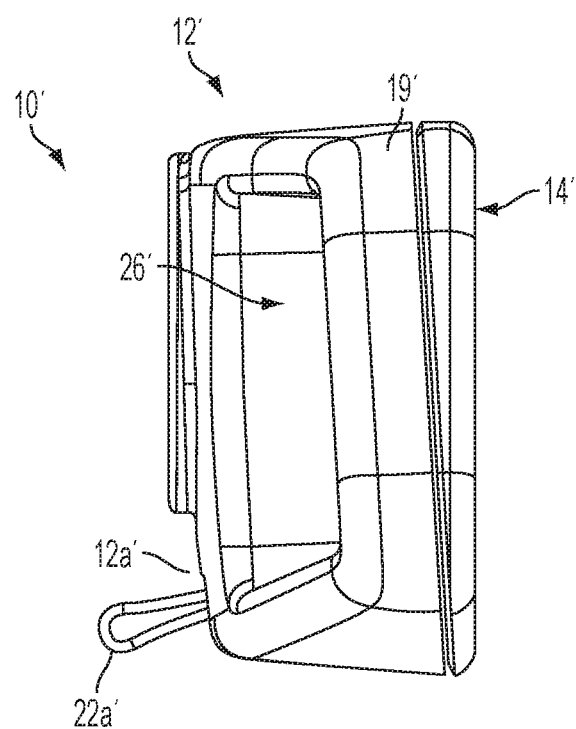
FIG. 15 is a side elevation of the mirror assembly of FIG. 13.
Figure 16:
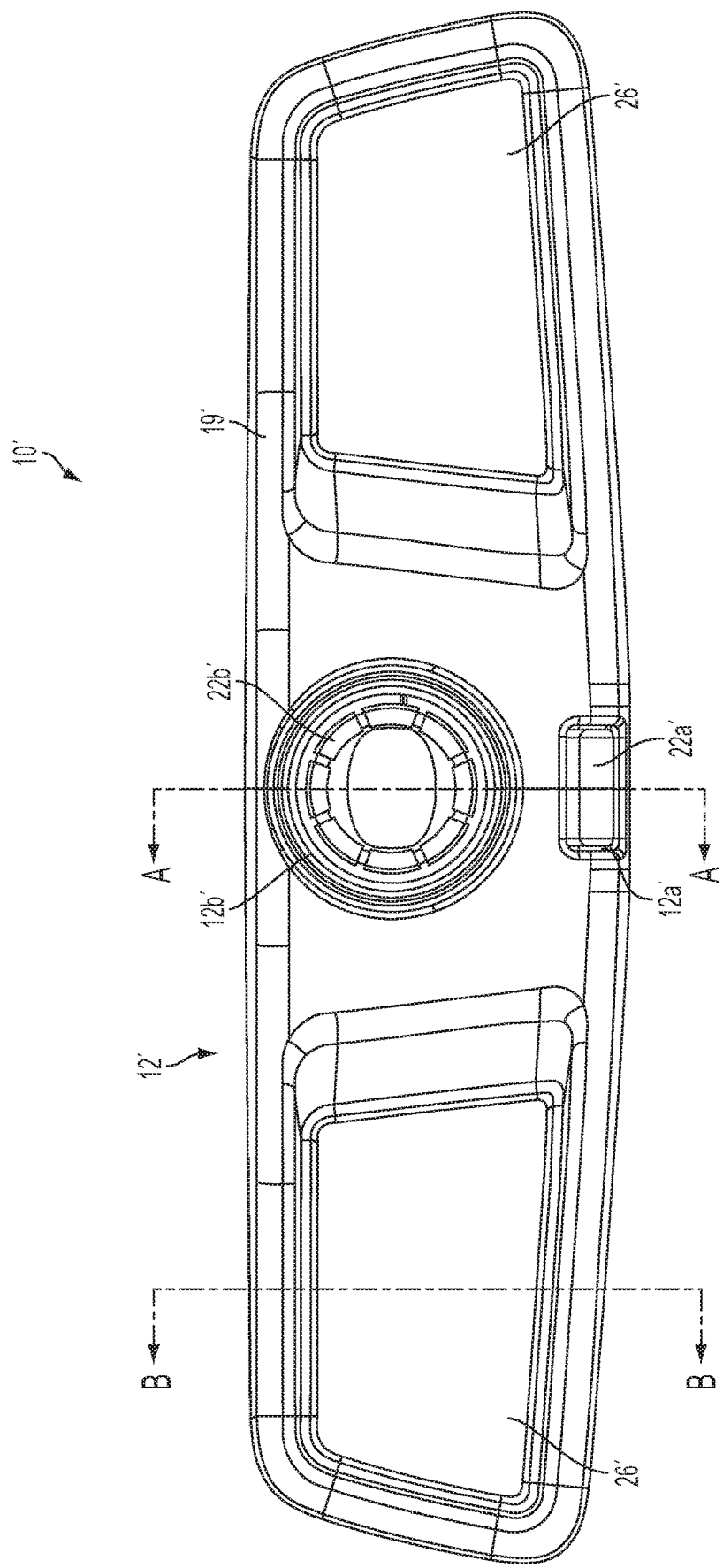
FIG. 16 is a rear elevation of the mirror assembly of FIG. 13.
Figure 16A:
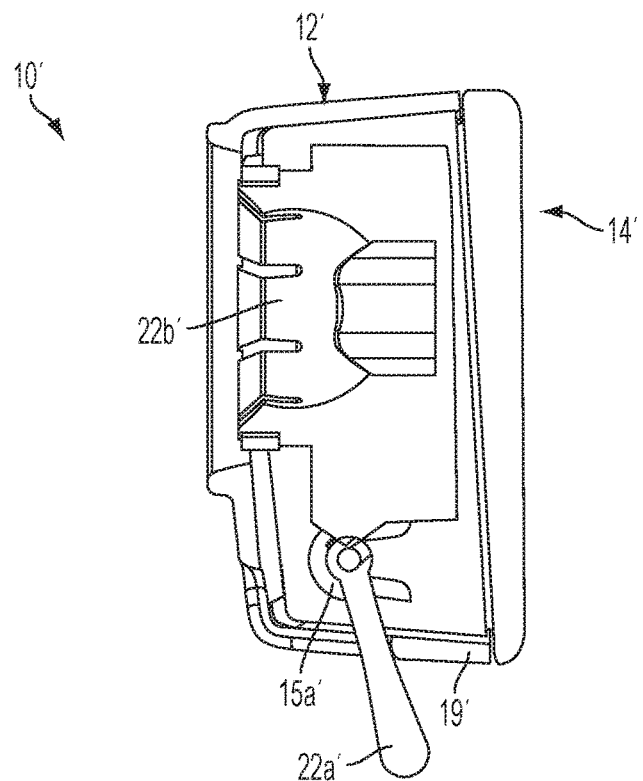
FIG. 16A is a sectional view of the mirror assembly taken along the line A-A in FIG. 16.
Figure 16B:
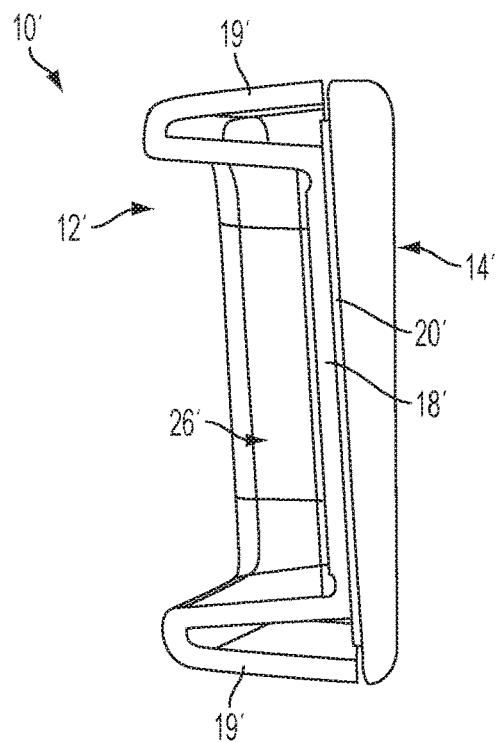
FIG. 16B is a sectional view of the mirror assembly taken along the line B-B in FIG. 16.
Figure 17:
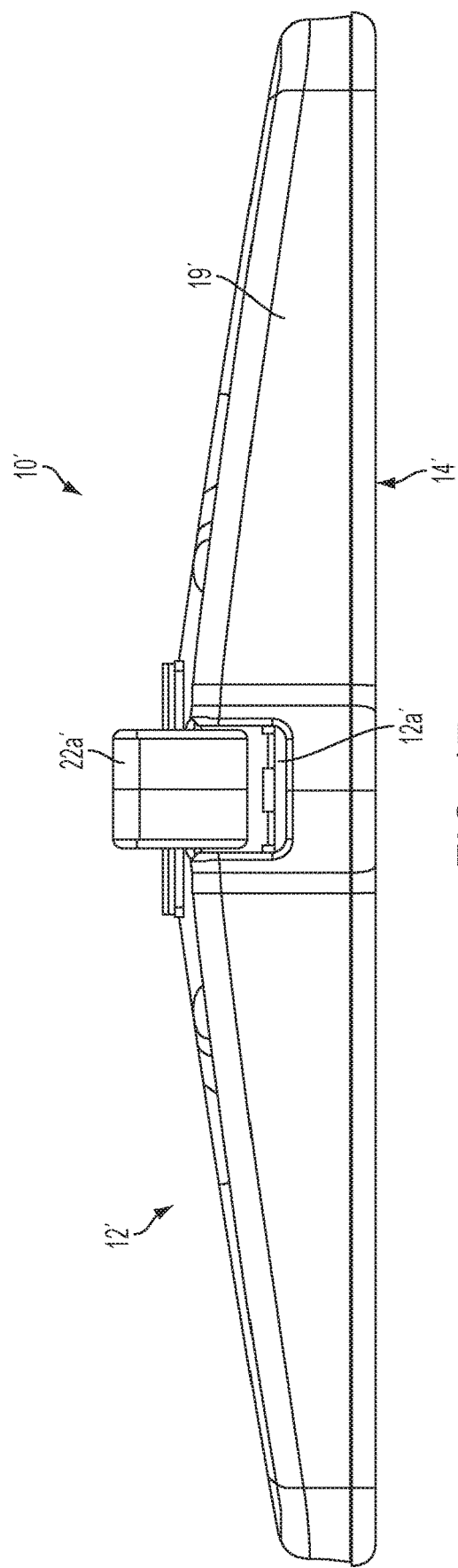
FIG. 17 is a lower plan view of the mirror assembly of FIG. 13.
Figure 18:
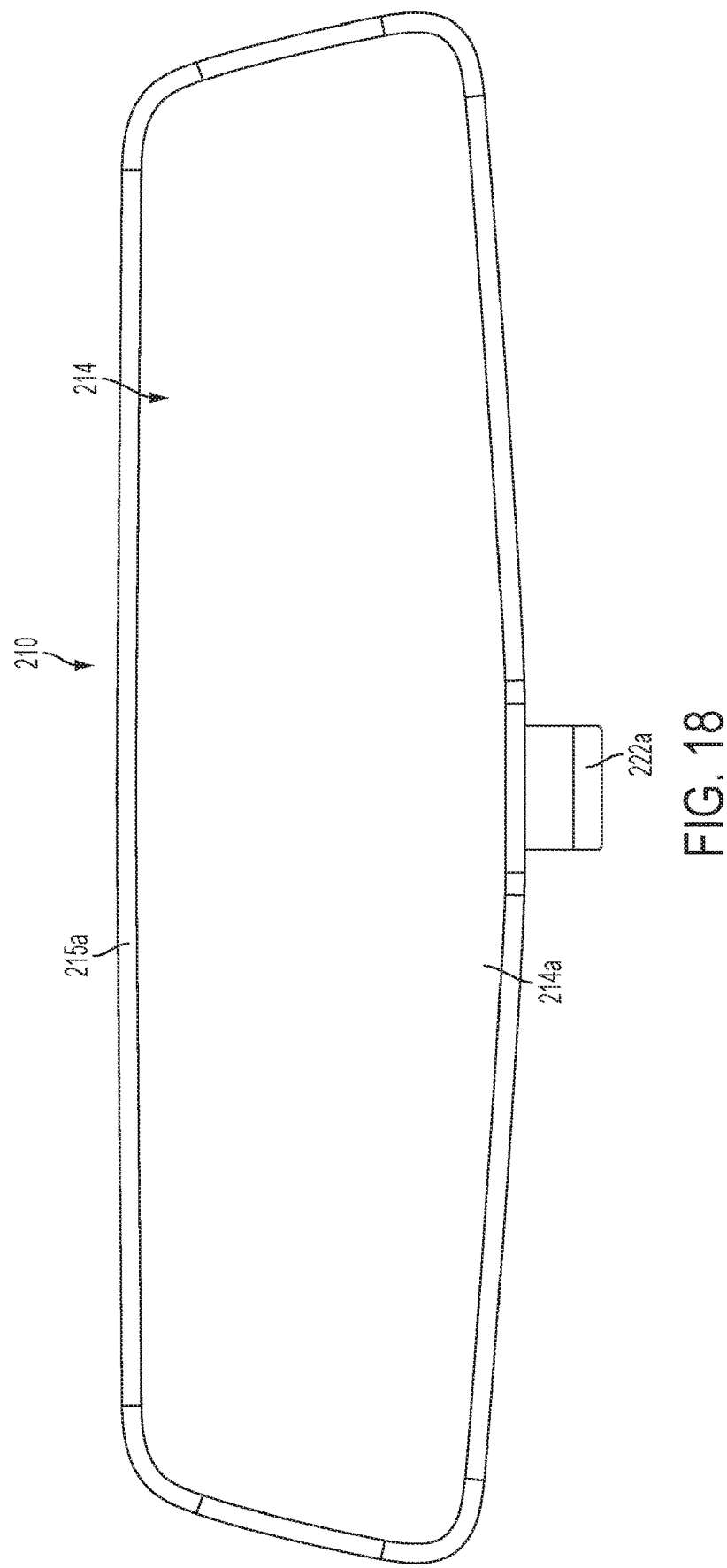
FIG. 18 is a front elevation of another mirror assembly in accordance with the present invention.
Figure 19:
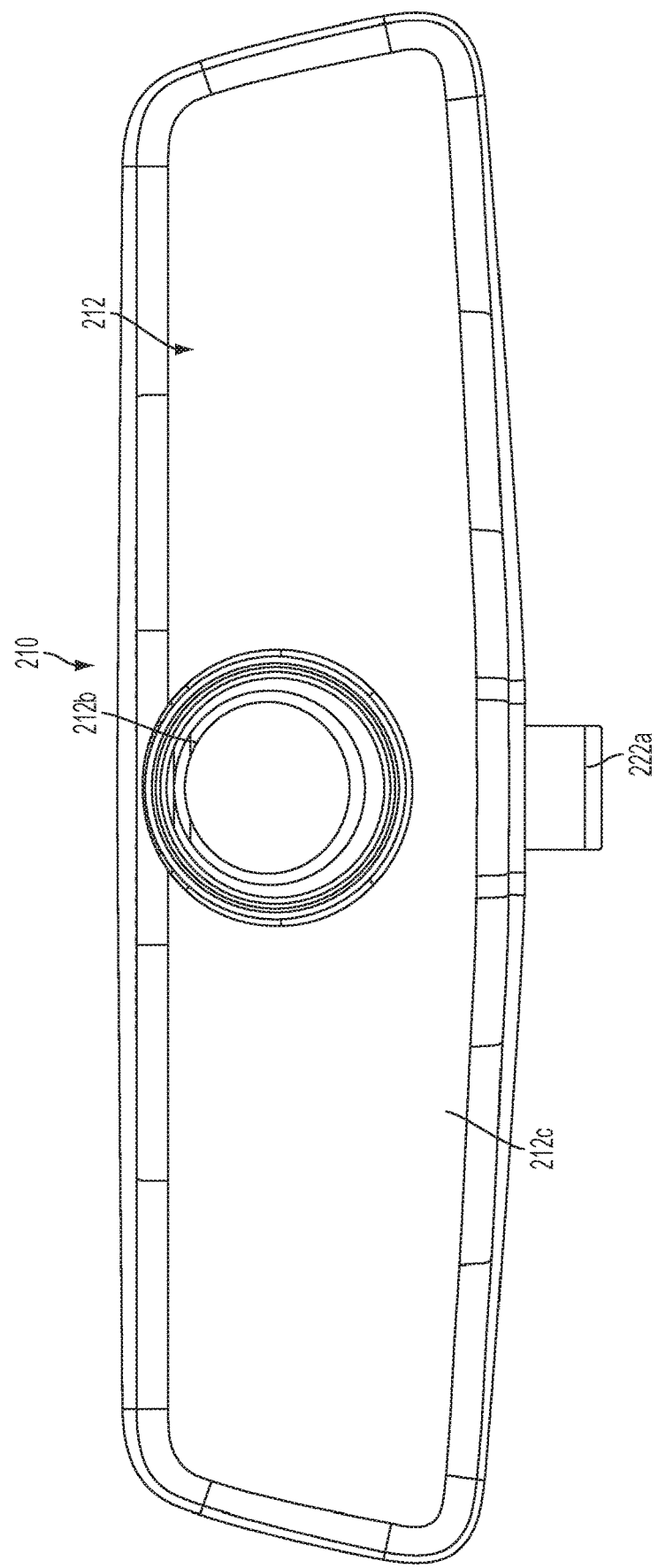
FIG. 19 is a rear elevation of the mirror assembly of FIG. 18.
Figure 20:
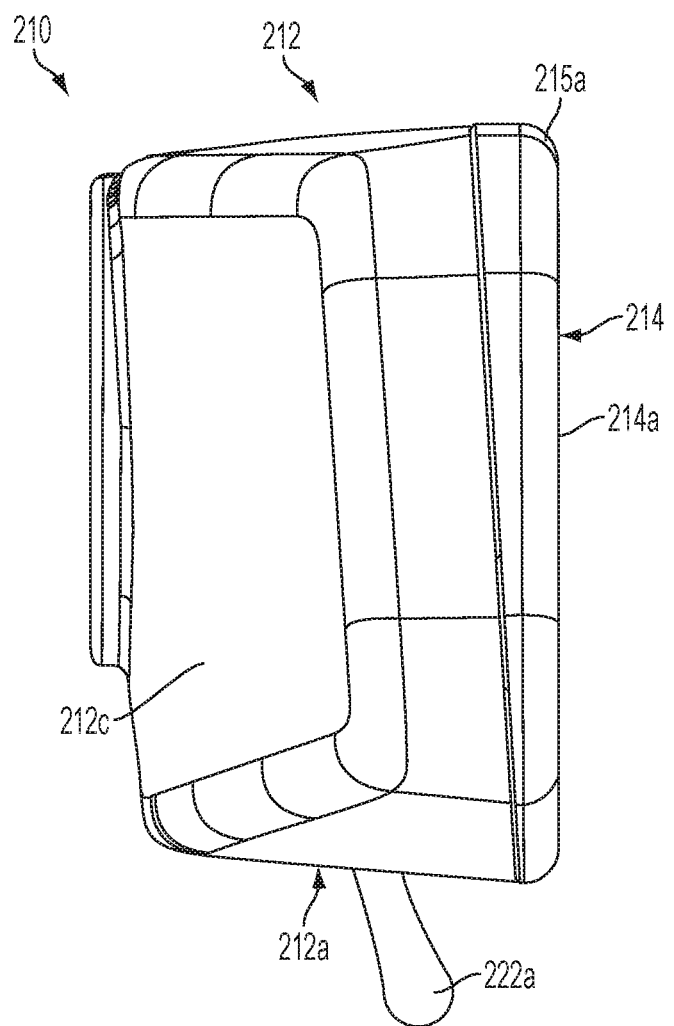
FIG. 20 is a side elevation of the mirror assembly of FIG. 18.

As shown in FIG. 13, mirror casing 12' includes a pair of toggle mounting walls 15', which include attachment elements 15a' formed or established thereat. Thus, the mirror casing 12' may be molded (such as via injection molding) and the toggle assembly 22' may be inserted into or received in the central cavity 24', with its toggle element or flip element or tab 22a' inserted through an opening or aperture 12a' formed at a lower region of mirror casing 12', and with its socket element or receiving portion 22b' disposed at (and optionally at least partially through) an opening or aperture 12b' at a rear portion of mirror casing 12'. The toggle body 22c' of toggle device 22' may be secured or attached or mounted at central cavity 24' of mirror casing 12', such as via snapping the body portion 22c' of toggle device 22' to snap elements or attachment elements 15a' formed or molded at walls 15' at central cavity 24' of mirror casing 12'.

The mounting arm or mounting element (not shown in FIGS. 13-17) attaches to receiving portion 22b' of toggle device 22' to attach the mirror casing 12' and reflective element 14' to the mounting structure. As shown in FIG. 13, a spring ring or pressure applying element 23' may be disposed at receiving portion 22b' and is used to apply generally even pressure around the ball socket to control the torque/effort required to adjust the mirror casing relative to the ball member of the mounting arm or element to adjust the driver's rearward field of view. As also can be seen in FIG. 13, an adhesive layer or tape or element 20' is disposed between attachment surfaces 18' and reflective element 14' and also between toggle device 22' and reflective element 14'. The adhesive layer or tape may comprise a foam tape or the like and may adhere the reflective element 14' to the mirror casing 12' and may also function as an anti-scatter barrier or element for the reflective element (to limit or substantially preclude shattering of the mirror glass during impact). Mirror assembly 10' may otherwise be substantially similar to mirror assembly 10, discussed above, such that a detailed discussion of the mirror assemblies need not be repeated herein.

Therefore, the present invention provides a bezeless mirror assembly that has a reflective element adhered or attached to a front or mounting surface of a mirror casing, with no mirror casing or bezel portion encompassing the perimeter edge and/or front surface of the mirror reflective element. When the reflective element is attached to the mirror casing, the perimeter region of the reflective element is generally flush or co-planar with the side walls of the mirror casing. The reflective element may include rounded perimeter edges to provide an enhanced appearance to the mirror assembly. Thus, the mirror assembly may be readily assembled by attaching the toggle device to a unitarily molded mirror casing and attaching the reflective element to the unitary mirror casing to retain the reflective element at the mirror casing and to encase the toggle device within the mirror casing. For mirror applications with one or more mirror-based accessories, the accessory or accessories may be received in or disposed at the rear recesses or cavities formed at the rear of the mirror casing and/or may be disposed at the mounting structure of the mirror assembly.

Optionally, the mirror casing may be formed to provide the generally planar attachment surfaces for adhering the mirror reflective element to the mirror casing (such as described above), and the mirror assembly may include a bezel portion that overlaps or encompasses the perimeter edges of the reflective element and a perimeter border region of the front surface of the reflective element, with the bezel portion snapping or otherwise attaching to the mirror casing, such as in a known manner. For example, and with reference to FIGS. 7-10, an interior rearview mirror assembly 110 for a vehicle includes a casing 112 and a reflective element 114 positioned at a front portion of the casing 112. Mirror assembly 110 is adjustably mounted to an interior portion of a vehicle (such as to an interior or in-cabin surface of a vehicle windshield or a headliner of a vehicle or the like) via a mounting structure or mounting configuration or assembly (not shown in FIGS. 7-10). The mirror casing 112 includes a front mounting surface or panel or substrate 118 (FIGS. 9 and 10) to which a rear surface 114a of the reflective element 114 is attached, such as via an adhesive or adhesive tape or the like. A bezel portion 116 encompasses the perimeter of the reflective element 114 and attaches to the mirror casing 112, such as via snapping or otherwise attaching to a forward perimeter edge region 112a of mirror casing 112.

Figure 9:
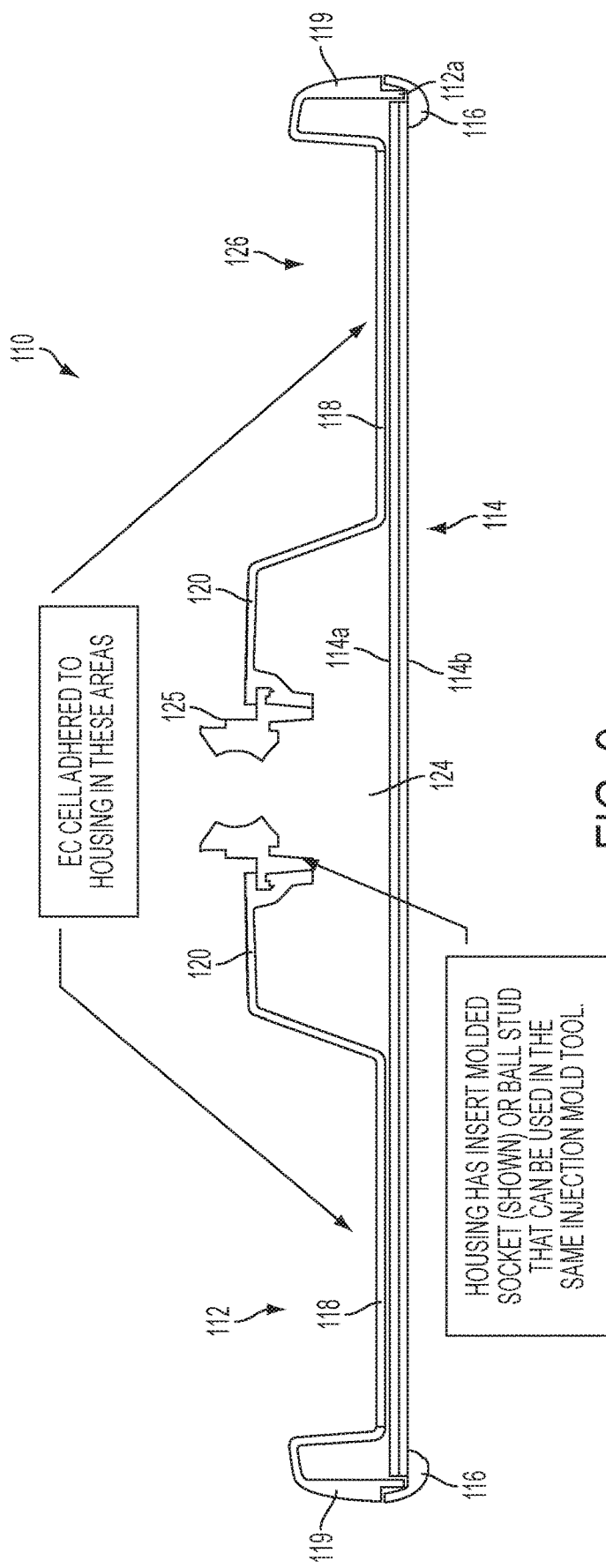
FIG. 9 is a sectional view of the interior rearview mirror assembly of FIG. 7.

Reflective element 114 may comprise an electro-optic (such as electrochromic) reflective element or may comprise a prismatic or wedge-shaped reflective element. Reflective element 114 includes rear surface 114a and front surface 114b (the surface that generally faces the driver of a vehicle when the mirror assembly is normally mounted in the vehicle). In the illustrated embodiment, reflective element 114 comprises an electrochromic reflective element that is adjustable relative to a mounting arm or pivot assembly. As shown in FIG. 9, the mirror assembly may include a socket or pivot mount 125 that is insert molded at a rear wall or center portion 120 of mirror casing 112, whereby the pivot mount 125 may receive a ball member of a mounting arm of a pivot assembly or mounting structure, such as a double pivot or double ball mounting structure or a single pivot or single ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. patent application Ser. No. 11/226,628, filed Sep. 14, 2005, and published Mar. 23, 2006 as U.S. Patent Publication No. US 2006/0061008, which are hereby incorporated herein by reference in their entireties).

Figure 8:
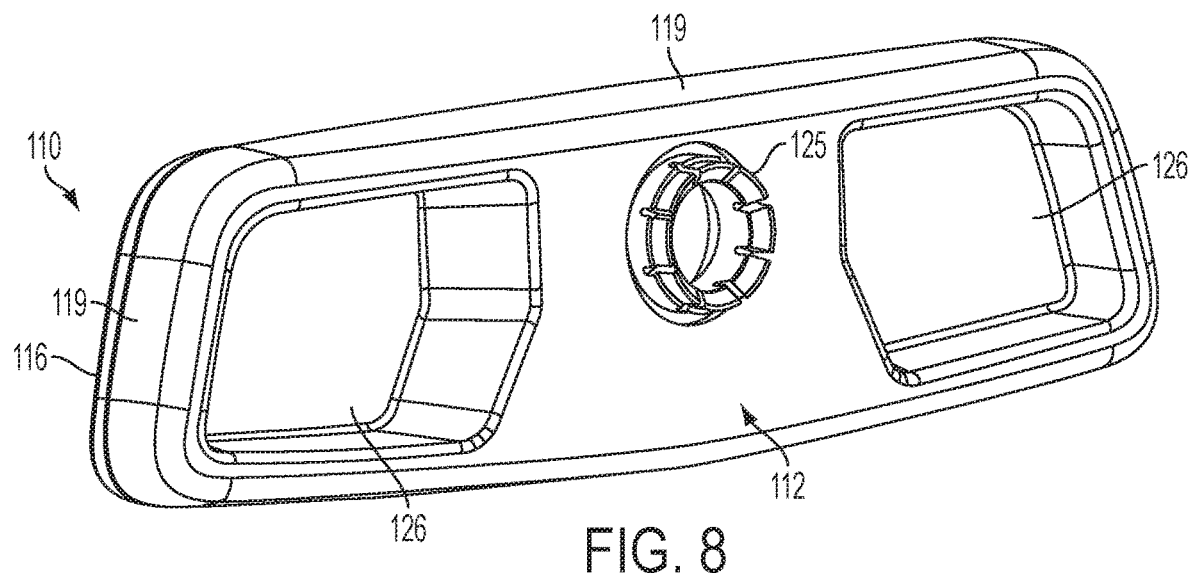
FIG. 8 is a rear perspective view of the interior rearview mirror assembly of FIG. 7.
Figure 10:
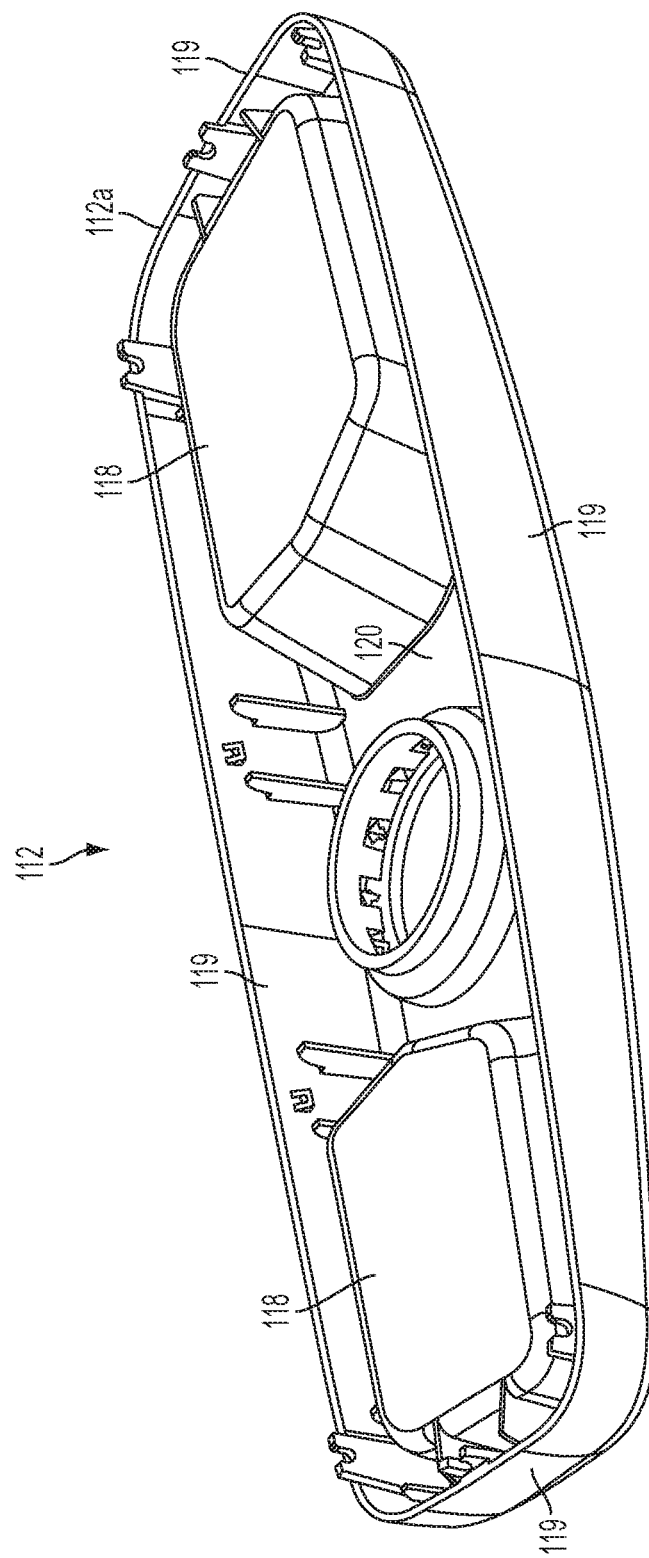
FIG. 10 is a perspective view of the mirror casing of the mirror assembly of FIG. 7, with the reflective element and bezel portion removed therefrom.
Figure 11A:
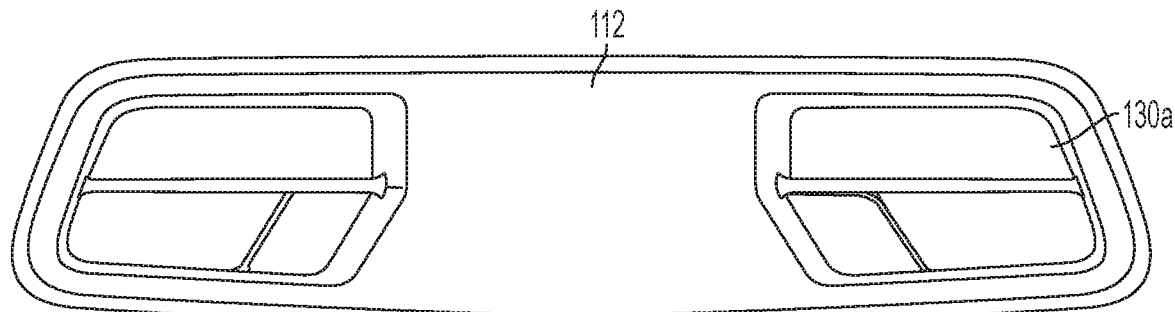
FIGS. 11A-11C are rear plan views of the mirror assembly, showing different structural patterned elements at the recesses of the mirror casing.
Figure 11B:
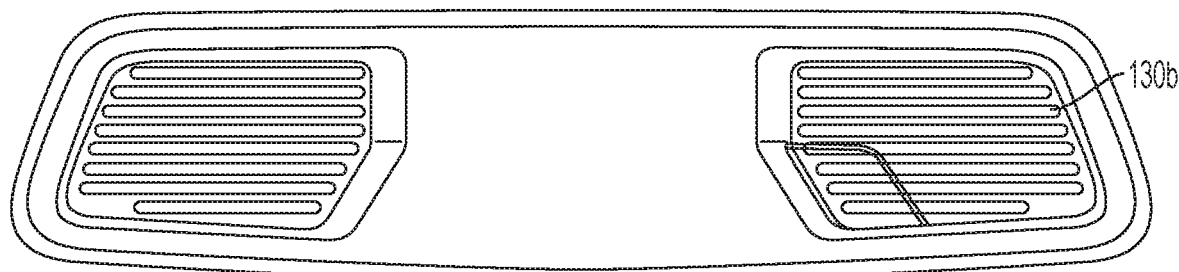
Figure 11C:
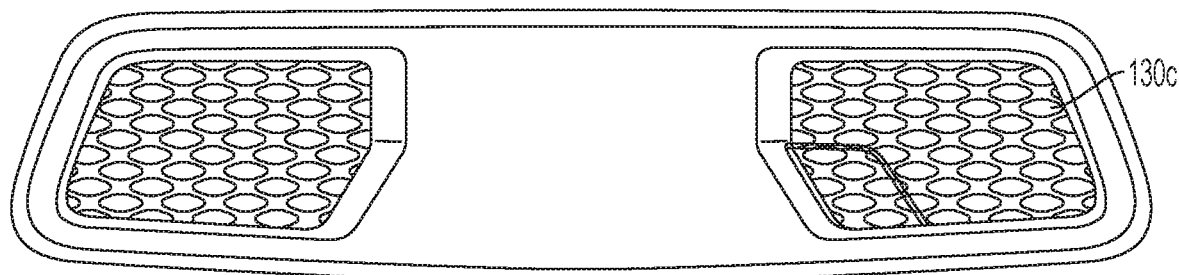

Mirror casing 112 comprises a plastic or polymeric molded casing having at least one generally planar front attachment surface or panel or wall 118 and upper, lower and side walls or outer surfaces 119 around the periphery of the mirror casing. In the illustrated embodiment, and as shown in FIG. 10, the mirror casing 112 is formed with two spaced apart attachment panels or surfaces 118, with the central region of the casing having a central cavity 124 and pivot mount 125 for receiving or attaching to a pivot mounting arm of a mounting structure of the mirror assembly. As shown in FIGS. 8 and 9, the rear portion of the casing 112 may have recesses 126 formed therein. Such recesses 126 are formed during the molding of mirror casing so that mirror casing 112 may be unitarily molded (such as via injection molding), whereby the central cavity 124 is established to be open at the front portion of the mirror casing and the recesses 126 are open at the rear portion of the mirror casing. The recesses may be closed or covered via cap portions or structural elements 130a-c (such as shown in FIG. 11A-C, respectively) or the like, and such cap portions may be for aesthetic purposes and/or may include one or more accessories, such as by utilizing aspects of the mirror assemblies described in U.S. Pat. No. 7,289,037, which is hereby incorporated herein by reference in its entirety.

Optionally, the mirror casing may be otherwise formed with a central cavity and generally planar attachment panels or surfaces or wings. For example, the mirror casing may include the center portion and central cavity and side panels or wings, but without the rear recesses and side walls and upper and lower walls around the perimeter of the side panels. Optionally, the mirror casing may comprise an injected molded plastic or polymeric casing, or may comprise a stamped metallic casing or may be an otherwise formed plastic or polymeric or metallic casing, while remaining within the spirit and scope of the present invention.

The reflective element 114 thus may be readily attached to the front surfaces 118 of the mirror casing 112. The reflective element 114 thus may be fixedly attached to the mirror casing 112 and may be pivoted with the mirror casing 112 relative to the mounting assembly to adjust the rearward field of view to the driver of the vehicle. The reflective element may be adhesively attached to the attachment surfaces of the mirror casing, or may be otherwise attached to the mirror casing, while remaining within the spirit and scope of the present invention. For example, the reflective element may include or may be adhered to a back plate structure that includes attachment elements for connecting to corresponding attachment elements of the mirror casing. For example, the back plate may include flexible tabs extending therefrom that flex to engage and snap to corresponding slots and tabs at the mirror casing to secure the reflective element to the mirror casing. The reflective element thus may be attached to the mirror casing via other suitable attachment means while the bezel portion 116 encompasses or overlaps the perimeter edge and a perimeter region of the front surface of the reflective element and snaps or otherwise attaches to the mirror casing 112.

Optionally, and with reference to FIGS. 11A-11C, the recesses 118 at the rear of mirror casing 112 may have a structural element or cap portion 130a-130c disposed therein. The cap portion or portions may be for aesthetic purposes and/or may provide structural rigidity to the mirror casing and may enclose or encompass the recesses to provide an enhanced, generally uniform appearance to the back of the mirror casing. Optionally, the element or elements may include accessories or circuitry or the like to provide optional electrical content to the mirror assembly, depending on the particular application of the mirror assembly (such as by utilizing aspects of the mirror assemblies described in U.S. Pat. No. 7,289,037, which is hereby incorporated herein by reference in its entirety). Optionally, the element or elements may be customized or selected by the vehicle manufacturer or dealership or vehicle owner to provide a desired appearance to the mirror casing (such as by utilizing aspects of the mirror assemblies described in U.S. patent application Ser. No. 11/912,576, filed Oct. 25, 2005, now U.S. Pat. No. 7,626,749, which is hereby incorporated herein by reference in its entirety).

Figure 12:
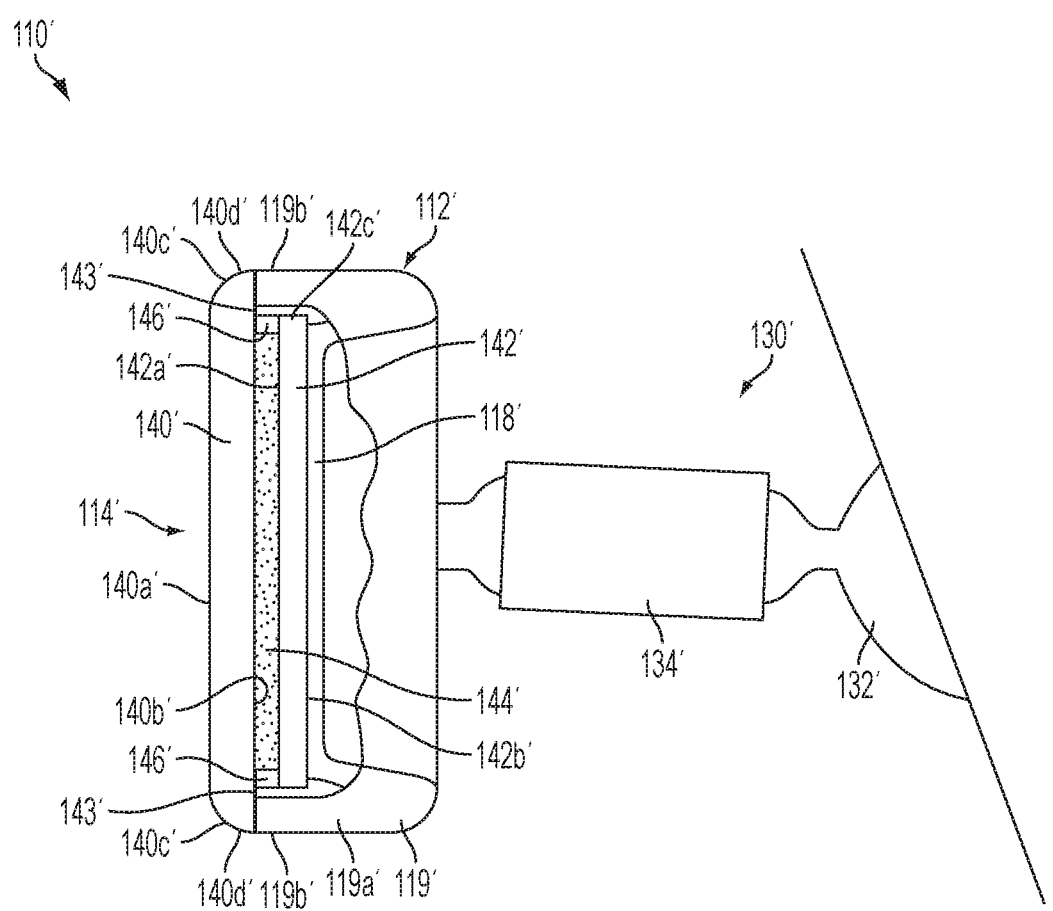
FIG. 12 is a side elevation and partial sectional view of another mirror assembly in accordance with the present invention, shown with an electro-optic reflective element attached to a mounting surface or panel of a mirror casing.

Optionally, and with reference to FIG. 12, an interior rearview mirror assembly 110' includes a casing 112', a reflective element 114' positioned at a front portion of the casing 112' with a front casing portion 119a' disposed around a periphery of the rear substrate 142' of the reflective element 114'. Mirror assembly 110' is adjustably mounted to an interior portion of a vehicle (such as to an interior or in-cabin surface of a vehicle windshield or a headliner of a vehicle or the like) via a mounting structure or mounting configuration or assembly 130', such as in a similar manner as described above. The front casing portion or outer wall of the front casing portion 119a' receives the rear substrate 142' of the reflective element therein and encompasses the perimeter edges 142c' of the rear substrate 142' of the reflective element 114'. As can be seen in FIG. 12, the front casing portion 112' abuts or is in close proximity to the rear surface 140b' of the front substrate 140' and does not overlap or encompass the perimeter edges of the front substrate 140' and does not overlap or encompass the perimeter regions of the front surface of the reflective element 114', and the front substrate 140' includes a ground or curved or rounded surface or bevel or contour or curvature 140c' at the front perimeter edge and side edge dimension to provide a smooth continuous transition between the generally planar front surface 140a' of the front substrate 140' and the generally planar or beveled or contoured or curved exterior surface 119b' of the front casing portion 119a' of mirror casing 112', as discussed below. The rear substrate 142' may be bonded or adhered (such as via an adhesive tape or the like that may also function as an anti-scatter barrier or element at the rear substrate of the reflective element) to an attachment surface or panel 118' of mirror casing 112', such as in a similar manner as described above.

In the illustrated embodiment, reflective element 114' comprises an electro-optic (such as electrochromic) reflective element or may comprise a prismatic or wedge-shaped reflective element. Reflective element 114' includes front substrate 140' having front or first surface 140a' (the surface that generally faces the driver of a vehicle when the mirror assembly is normally mounted in the vehicle) and rear or second surface 140b' opposite the front surface 140a', and a rear substrate 142' having a front or third surface 142a' and a rear or fourth surface 142b' opposite the front surface 142a', with an electro-optic medium 144' disposed between the second surface 140b' and the third surface 142a' and bounded by a perimeter seal 146' of the reflective element (such as is known in the electrochromic mirror art). The second surface 140a' has a transparent conductive coating established thereat, while the third surface 142a' has a conductive coating (such as a metallic reflector coating for a third surface reflector mirror element or such as a transparent conductive coating for a fourth surface reflector mirror element) established thereat.

Reflective element 114' includes an opaque or substantially opaque or hiding perimeter layer or coating or band 143' disposed around a perimeter edge region of the front substrate 140' (such as at a perimeter region of the rear or second surface 140b' of the front substrate) to conceal or hide or the perimeter seal from viewing by the driver of the vehicle when the mirror assembly is normally mounted in the vehicle. Such a hiding layer or perimeter band may be reflective (such as specularly reflective) or not reflective and may utilize aspects of the perimeter bands and mirror assemblies described in U.S. Pat. Nos. 7,626,749; 7,274,501; 7,184,190 and/or 7,255,451, PCT Application No. PCT/US2006/018567, filed May 15, 2006, which published Jul. 5, 2007 as International Publication No. WO 2006/124682; PCT Application No. PCT/US2003/029776, filed Sep. 19, 2003, which published Apr. 1, 2004 as International Publication No. WO 04/026633; and/or PCT Application No. PCT/US2003/035381, filed Nov. 5, 2003, which published May 21, 2004 as International Publication No. WO 2004/042457, and/or U.S. patent application Ser. No. 11/226,628, filed Sep. 14, 2005, and published Mar. 23, 2006 as U.S. Patent Publication No. US 2006/0061008, which are hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, other opaque or substantially opaque coatings or bands may be implemented while remaining within the spirit and scope of the present invention.

Optionally, the perimeter border layer or band may be established via any suitable means, such as screen printing or vacuum deposition or the like. Optionally, the perimeter or border band (either specularly reflecting or non-reflecting or the like) may be established at the front surface of the front substrate (such as over the curved perimeter edge and a perimeter region of the front surface of the front substrate). Optionally, the front substrate may be frosted or diffused at the perimeter region so that the perimeter seal and mirror casing are concealed or rendered covert to a person viewing the mirror assembly and reflective element when the mirror assembly is normally mounted in a vehicle.

The reflective element 114' and mirror casing 112' are adjustable relative to the mounting arm or pivot assembly 130' to adjust the driver's rearward field of view when the mirror assembly is normally mounted at or in the vehicle. In the illustrated embodiment, mounting assembly 130' comprises a double-ball or double-pivot mounting assembly whereby the reflective element and casing are adjustable relative to the vehicle windshield (or other interior or in-cabin portion of the vehicle) about a pair of pivot joints. Mounting assembly 130' includes a base portion or mounting base 132' and a mounting arm 134', with the mounting arm 134' pivotally mounted at the mounting base 132' at a base or first ball pivot joint and the reflective element 114' and mirror casing 112' pivotally mounted at mounting arm 134' about a mirror or second ball pivot joint. Optionally, the mounting assembly may comprise other types of mounting configurations, such as a single-ball or single-pivot mounting configuration or the like, while remaining within the spirit and scope of the present invention.

Mirror casing 112' comprises a plastic or polymeric molded casing that may attach to the mounting assembly 130' via any suitable manner. The casing may comprise any suitable casing construction, and has a forward perimeter edge or receiving portion 119a' for receiving the rear substrate 142' of the mirror reflective element 114' therein, and may have the attachment panel or panels integrally molded with the outer casing walls 119', such as in a similar manner as described above. Optionally, the mirror casing may include cap portions that may include one or more accessories, such as by utilizing aspects of the mirror assemblies described in U.S. Pat. No. 7,289,037, which is hereby incorporated herein by reference in its entirety.

As can be seen in FIG. 12, front surface 140a' of front substrate 140' includes a perimeter portion or element that has an outer curved front edge or surface 140c' (that may be ground or otherwise formed or established) that provides a smooth or curved transition surface between the front surface 140a' of the reflective element 114' and the exterior surface 119b' of the front casing portion 119a' of walls 119' of mirror casing 112' (which is generally coplanar or generally flush with the rear perimeter edge dimension 140d' of front substrate 140' when the mirror reflective element 114' is received in front casing portion 119a' of mirror casing 112'). The front casing portion 119a' abuts or is in close proximity to the rear surface 140b' of front substrate 140' to encompass the rear substrate 142' and the perimeter seal 146' and electro-optic medium 144', and the perimeter band 143' hides or conceals the perimeter seal 146' from view by a person viewing the reflective element when the mirror assembly is normally mounted in a vehicle. The reflective element 114' thus may utilize aspects of the reflective element assemblies described in U.S. provisional application Ser. No. 61/261,839, filed Nov. 17, 2009, which is hereby incorporated herein by reference in its entirety.

In the illustrated embodiment, the radius of curvature of the curved surface 140c' of front substrate 140' is about 2.5 mm or about 3 mm or thereabouts, but may be greater than or less than this dimension depending on the particular application of the reflective element and mirror casing of the mirror assembly. Typically, it is desired to have at least about a 2.5 mm radius of curvature at the perimeter edges of a mirror assembly (typically at a bezel of a conventional mirror assembly) to meet the minimum safety standards for head impact with the mirror, such as during a sudden stop or collision of the equipped vehicle.

Thus, the bevel or contour or curvature of the curved edges 140c' of the front substrate 140' and the bevel or contour or curvature of surface 119b' of the mirror casing 112' may generally align or match to provide a generally continuous surface or contour or curvature at the junction of the front substrate and the mirror casing. Any interface between the front substrate and the mirror casing may be reduced or minimized, such as by a close fit arrangement of the front substrate and mirror casing and/or by the glass front substrate slightly nesting into a the mirror casing (such as via a slight lip at the mirror casing that may overlap a slight portion of the side perimeter edge of mirror front substrate), or such as by affirmatively filling any gap between the front substrate and mirror casing with a gap closing or gap filling material or means.

Therefore, the mirror casing 112' receives the rear substrate 142' of the reflective element therein and does not encompass the perimeter edges of the front substrate or the front surface 140a' of the reflective element such that the entire front surface 140a' of the reflective element 114' is exposed and viewable by the driver of a vehicle when the mirror assembly is normally mounted in the vehicle. The curved transition surface 140c' of the front substrate 140' provides a smooth continuous curved transition between the generally planar front surface 140a' of the front substrate 140' and the generally planar or curved or contoured or beveled exterior surface 119b' of the mirror casing 112'. The front substrate thus has larger cross dimensions relative to the rear substrate so that the front substrate extends beyond corresponding edges of the rear substrate, and the perimeter edge of the front substrate of the reflective element is exposed and viewable by the driver of the vehicle when the reflective element is attached to the attachment surface or panel and when the mirror assembly is normally mounted in the equipped vehicle. The exposed perimeter edge of the front substrate has a rounded front portion to provide a curved transition between a front surface of the front substrate and the exterior surface of the mirror casing.

Figure 21:
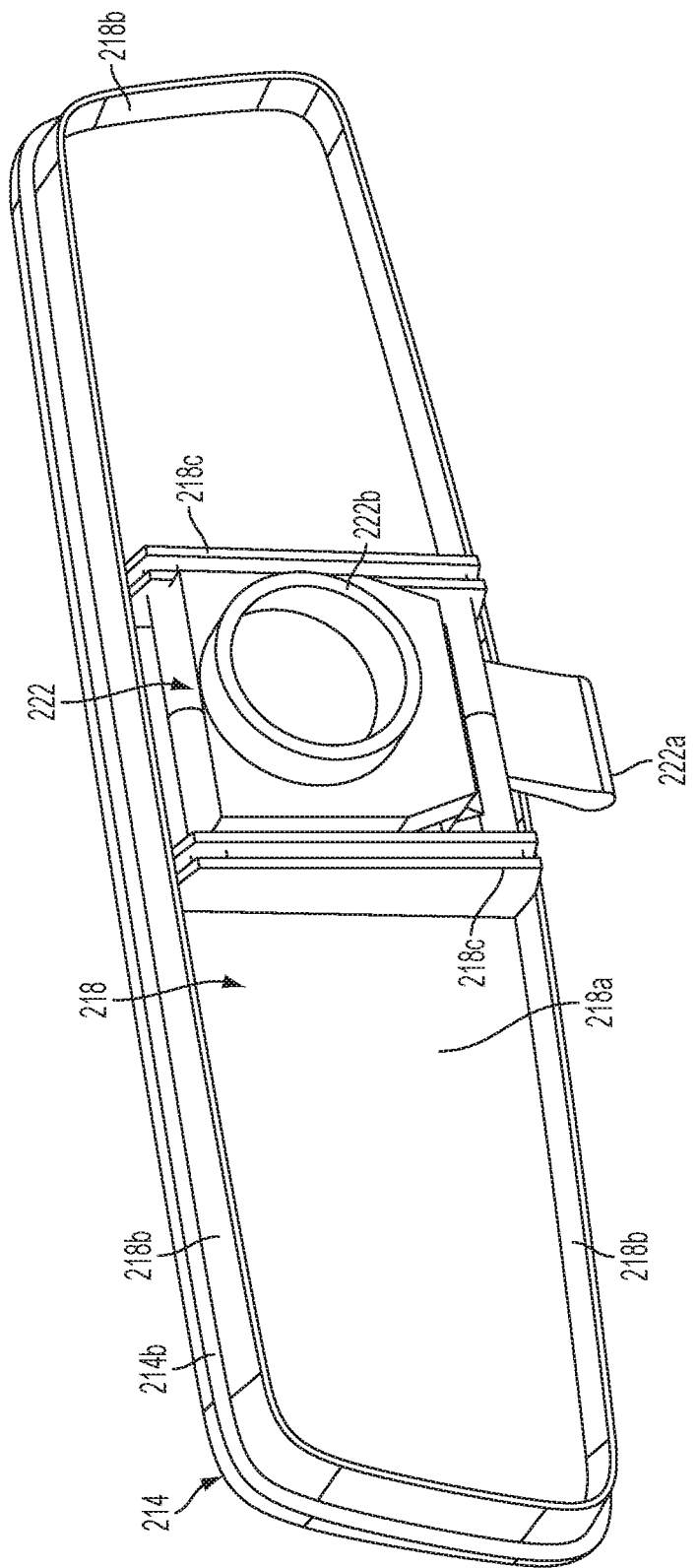
FIG. 21 is a rear perspective view of a backing plate and toggle element attached at a rear of the reflective element of the mirror assembly of FIG. 18.

Optionally, the mirror assembly of the present invention may have a mirror casing that has the reflective element adhered thereto, and that does not include recesses formed at the rear of the mirror casing. For example, and with reference to FIGS. 18-23, a mirror assembly 210 includes a casing 212 and a bezelless reflective element 214 (having a forward edge portion 215a of a perimeter edge 215 rounded to provide a smooth curved transition between the perimeter region of a front surface 214a of reflective element 214 and perimeter edge 215 and mirror casing 212, such as discussed above with respect to mirror assembly 10) positioned at a front portion of the casing 212. Mirror assembly 210 is adjustably mounted to an interior portion of a vehicle (such as to an interior or in-cabin surface of a vehicle windshield or a headliner of a vehicle or the like) via a mounting structure or mounting configuration or assembly (not shown in FIGS. 18-23), such as in a similar manner as discussed above. The mirror assembly 210 includes an attachment plate 218 that is bonded to (such as via an adhesive tape or other suitable adhesive layer or material or the like) the rear surface of reflective element 214, such as shown in FIG. 21. Mirror casing 212 attaches to attachment plate 218 at the rear of the reflective element and mirror casing 212 has a solid or non-recessed rear surface 212c (FIGS. 19, 20, 22 and 23) and does not include recesses established thereat.

In the illustrated embodiment, attachment plate 218 includes a front mounting surface or panel 218a to which a rear surface of the reflective element 214 is attached, such as via an adhesive or adhesive tape or the like. Attachment plate 218 includes a perimeter wall or flange 218b that extends rearward from panel 218a to provide an attaching flange to which mirror casing 212 is attached. As shown in FIG. 21, attachment plate 218 may include toggle mounting walls or elements 218c that protrude rearward from panel 218a and that may include toggle attaching elements or snap elements to facilitate attachment of or mounting of toggle device 222 at or to the attachment plate 218.

Figure 22:
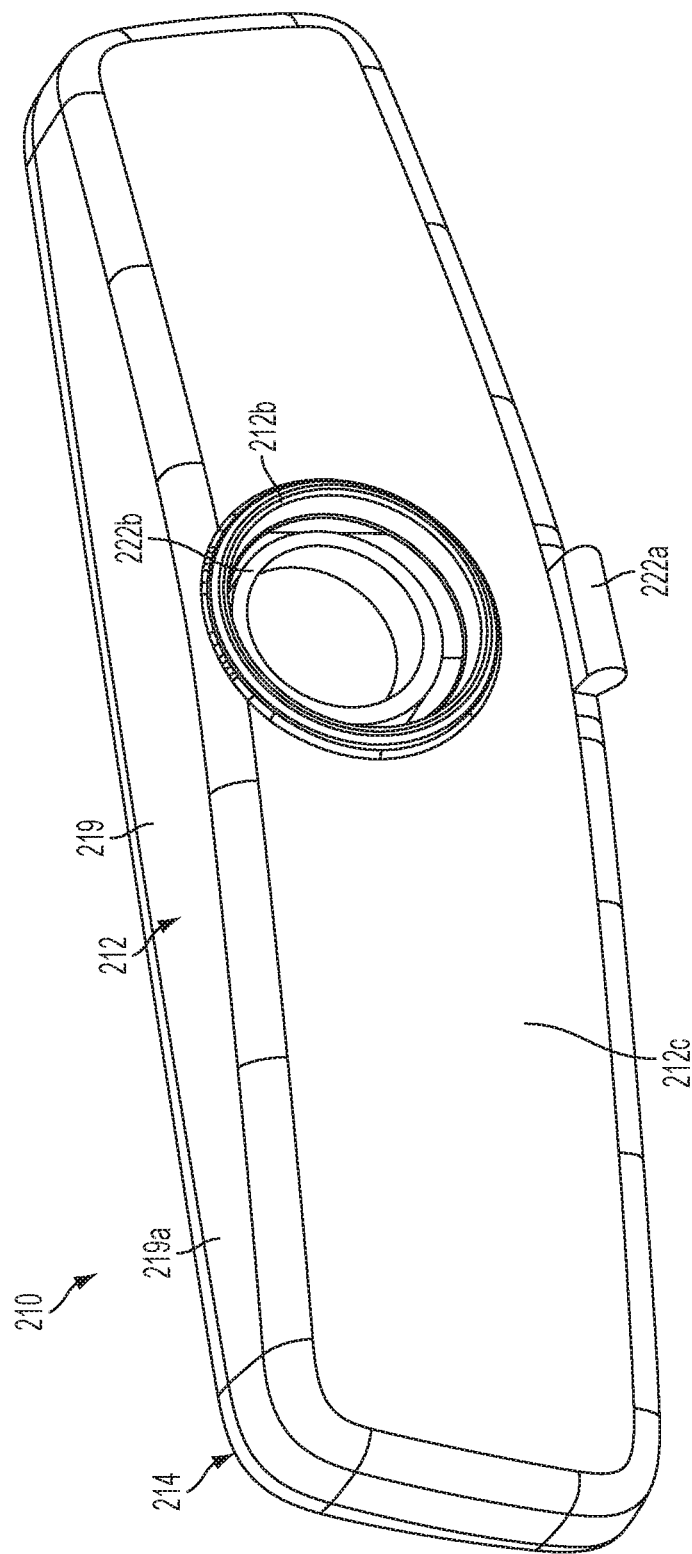
FIG. 22 is a rear perspective view of the mirror assembly of FIG. 18, shown with the mirror casing attached over the backing plate and toggle element of FIG. 21.
Figure 23:
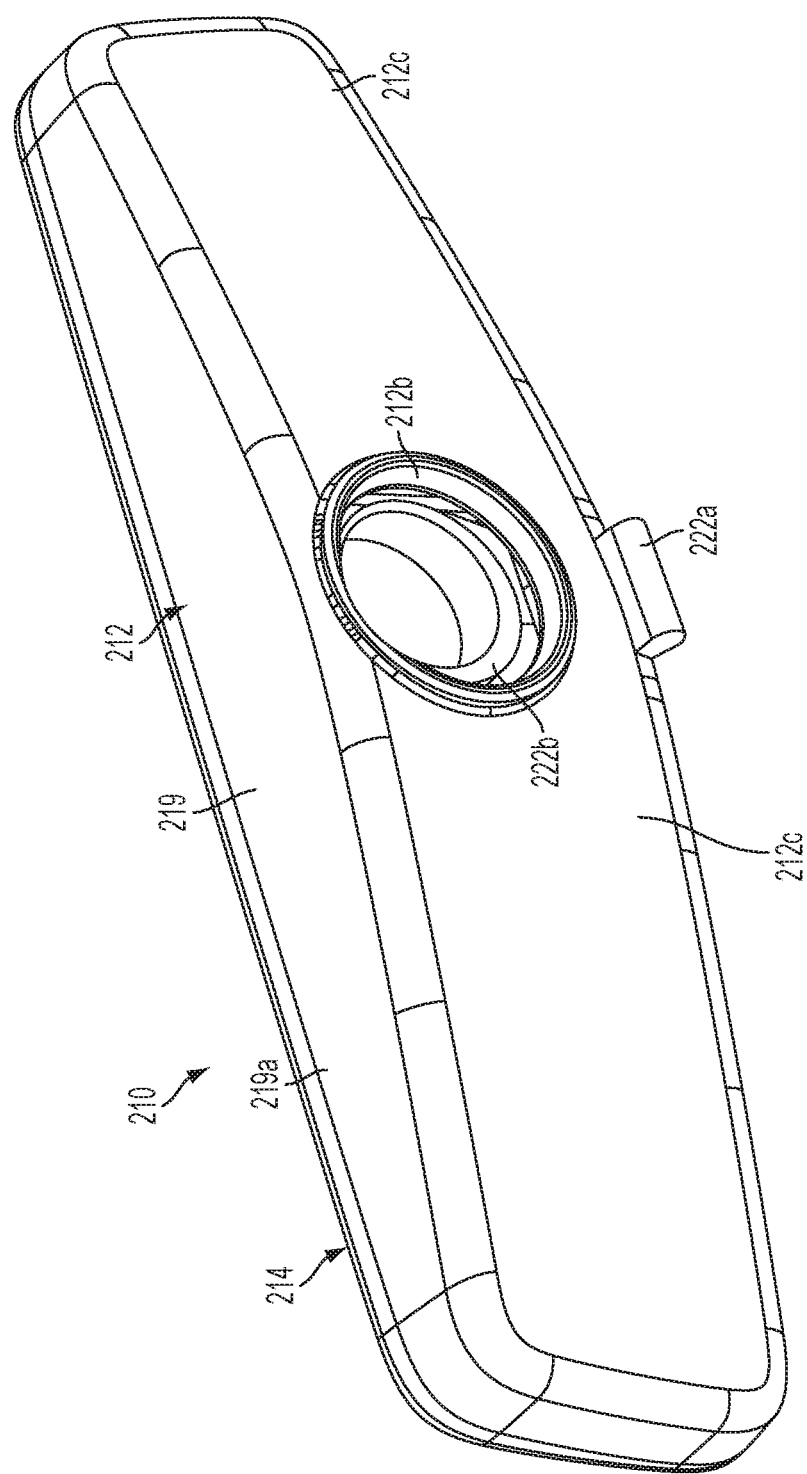
FIG. 23 is another rear perspective view of the mirror assembly of FIG. 18.

When the reflective element 214 is attached or adhered to panel 218a of attachment plate 218, the perimeter edges of the mirror substrate or reflective element extend beyond the perimeter edges and perimeter flange 218b to establish overhang regions 214b of reflective element 214, as can be seen in FIG. 21. The flange and mirror casing are configured to provide attachment of the casing to the attachment plate. For example, the flange or rib 218b may have slots or snap elements formed therein that are similar to slots or snap elements on bezels and/or casings of known snap-together mirror designs, and the mirror casing may include snap or latch elements or features or slots at locations that correspond to the respective features or elements on the flange of the attachment plate, so as to substantially retain or lock the two components together when the mirror casing is moved into engagement with the flange of the attachment plate. As shown in FIGS. 22 and 23, when the mirror casing 212 is attached to attachment plate 218 (such as via the mirror casing snapping and/or adhering to the flange of the attachment plate), the forward edges 219a of the perimeter walls 219 of mirror casing generally abut or approach the perimeter regions of the rear surface of the reflective element and the perimeter edge regions of the reflective element are flush with or generally co-planar with the outer surfaces of the sidewalls of the mirror casing, such as in a similar manner as discussed above with respect to mirror assembly 10.

Thus, the mirror casing 212 may be molded (such as via injection molding) and may be attached to the attachment plate 218. When so attached, the toggle element or flip element or tab 222a of toggle assembly 222 (disposed at and mounted at the rear of attachment plate 218) is received or inserted through an opening or aperture 212a formed at a lower region of mirror casing 212, and the socket element or receiving portion 222b of toggle device 222 is disposed at (and optionally at least partially through) an opening or aperture 212b at a rear portion of mirror casing 212. The toggle body 222c of toggle device 222 may be secured or attached or mounted at toggle mounting walls 218c of attachment plate 218, such as via snapping the body portion 222c of toggle device 222 to snap elements or attachment elements formed or molded at walls 218c of attachment plate 218.

The mounting arm or mounting element (not shown in FIGS. 18-23) attaches to receiving portion 222b of toggle device 222 to attach the mirror casing 212 and attachment plate 218 and reflective element 214 to the mounting structure. An adhesive layer or tape or element is disposed between the front surface of the attachment panel 218a of attachment plate 218 and reflective element 214 to adhere or attach the reflective element 214 to the attachment plate 218. The mirror casing 212 may snap or adhere to the attachment plate 218, whereby the perimeter edges of the reflective element are generally flush with the outer surfaces of the perimeter walls of the mirror casing. The mirror casing may comprise an injection molded casing, with its perimeter walls and rear walls or surfaces unitarily formed together and establishing or providing a cavity within the mirror assembly and between the casing and the attachment plate when the mirror casing is attached to the attachment plate. The cavity may house one or more accessories or circuitry or the like within the mirror assembly. Mirror assembly 210 may otherwise be substantially similar to mirror assembly 10, discussed above, such that a detailed discussion of the mirror assemblies need not be repeated herein.

In the illustrated embodiment, the reflective element of mirror assembly 210 comprises a prismatic reflective element that can be flipped or toggled between a daytime position and a nighttime position via the toggle device. Although shown and described as being a prismatic reflective element, it is envisioned that a mirror assembly similar to mirror assembly 210 may include or support an electro-optic reflective element (such as, for example, an electrochromic reflective element or the like). In such an application, the attachment plate may be adhered or bonded to the rear of the rear substrate of the reflective element and the mirror casing may receive the flange of the attachment plate and the rear substrate and perimeter seal and electro-optic medium therein, with the forward periphery edges of the mirror casing abutting or being in close proximity to the rear surface of the front substrate, such as in a similar manner as discussed above with respect to mirror assembly 110'.

The exposed front substrate of an electro-optic mirror reflective element or the exposed substrate of a prismatic mirror reflective element of a mirror assembly of the present invention preferably has rounded or curved or ground and/or polished perimeter edges to provide a smooth transition between the generally planar front surface of the mirror element (that is viewed by the driver of the vehicle when the mirror assembly is normally mounted in the vehicle) and the outer surfaces of the walls of the mirror casing. The substrate may be cut or machined or otherwise formed via any suitable forming process and the curved or rounded perimeter edges of the substrate may be ground or otherwise established via any suitable forming process, while remaining within the spirit and scope of the present invention.

Figure 24:
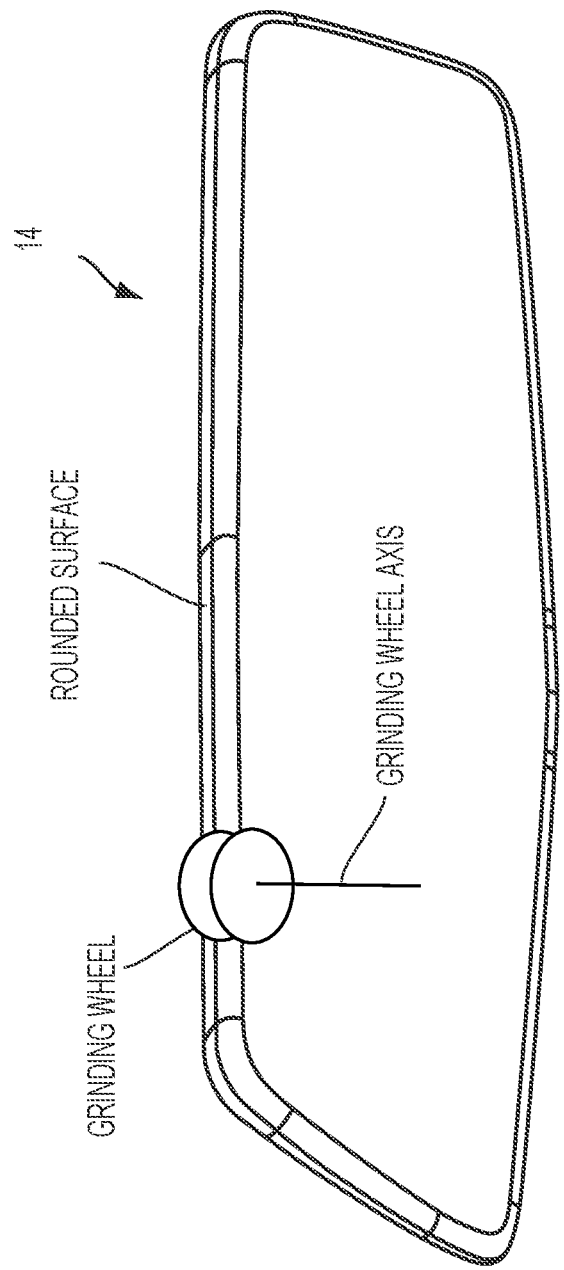
FIG. 24 is a perspective view showing a grinding wheel that grinds the front perimeter edge portion of the glass substrate by moving around the periphery of the glass substrate while rotating about a grinding wheel axis.

For example, the mirror glass substrate may be machined via a Computer Numerical Control (CNC) type equipment or process, where the mirror glass may be aligned and fixed to a fixture which properly supports and positions the mirror glass substrate. The grinding and polishing wheels (see FIG. 24) are typically attached to a moving head which follows a predetermined program and moves around the perimeter of the mirror glass substrate. The wheel centerline is typically, but not always, at about a 90 degree angle relative to the front surface of the mirror glass to apply a sharp edge radius at the perimeter edge of the mirror glass substrate. Optionally, the wheel may pivot on its centerline axis to maintain a selected or appropriate or proper angle relative to the appropriate mirror glass surface to apply the required edge application. An example of such a machining application is for establishing or applying the rear seam to the mirror glass substrate when the mirror glass is in a fixed position.

Optionally, the mirror glass substrate may be formed or established via a robot controlled wheel movement. Such a process is similar to the CNC machining process, discussed above, and the mirror glass substrate is aligned and fixed to a fixture which properly supports and positions the mirror glass substrate. The grinding and polishing wheels are attached to the end of the robot arm and manipulated around the perimeter of the mirror glass in accordance with a predetermined program to establish the desired or selected edge profile around the mirror glass substrate. Another optional approach is a robot controlled substrate movement process, where the mirror glass substrate is aligned and fixed to the robot End of Arm Tooling (EOAT), and where the grinding and polishing wheels are in fixed positions. Per a predetermined program, the robot manipulates the EOAT with the mirror glass around the grind and polish wheels, thereby establishing and maintaining the proper part profile. The wheel centerline is typically, but not always, at about a 90 degree angle relative to the front surface of the mirror glass substrate to apply the edge radius. However, the wheel may pivot on its centerline axis to establish and maintain the proper angle relative to the appropriate mirror glass surface to apply the required edge application.

Optionally, other means may be utilized to establish the desired or appropriate or selected edge radius around the perimeter edge of the exposed substrate. For example, a radius edge of about a 2.5 mm radius or more (a minimum of about a 2.5 mm radius is desired or required on the exposed mirror glass edge for safety reasons) may be established via any suitable means. The radius applied to the mirror glass edge may be greater than about 2.5 mm, such as about a 3.0 mm edge radius or more. A larger edge radius (such as about 3.0 mm) may be selected to allow for tool wear during the grind and polish process, while ensuring that the substrate has a minimum of about a 2.5 mm radius, as well as produce a pleasing appearance at the glass edge. Once the tool wears from about a 3.0 mm radius sufficiently enough to produce about a 2.5 mm radius, the tool then may have the about 3.0 mm radius reapplied. A larger radius may be applied, ensuring that the minimum field of view of the reflective element is maintained, as required, at the front surface of the glass between the radius tangency points.

The grinding of the perimeter edges may be accomplished via any suitable grinding/polishing tools. For example, the grinding process can be done using a single grind wheel or a series of grinding wheels at varying degrees of coarseness. A typical process may have one coarse grind wheel and one fine grind wheel. The coarse grind wheel could be of, for example, about a 150-200 grit level, while the fine grind wheel could be of, for example, about a 200-500 grit level. If a single grind wheel is used, it could be of, for example, about a 200-250 grit level or thereabouts or other suitable grit level. The grinding wheel is typically a metal bond type wheel impregnated with a diamond cutting media, but other forms of grinding wheels or means may be contemplated within the spirit and scope of the present invention.

Optionally, the rear seam grinding process may be achieved in the same or similar manner as the radius edge grind. For example, a grinding wheel (many shapes possible:

flat angled, beveled, convex, concave, and/or the like) may be used along the rear edge to seam and seal the painted edge with a single grind wheel. Such a grind wheel may be of, for example, about a 200-250 grit level.

The polishing process can be done using many different types of wheel compounds, including, but not limited to, clay, rubber, felt, metal/resin hybrids, cork, urethane, and/or the like. A polishing media may be applied, including, but not limited to, water, oils, polishing compounds (rouge), and/or the like. The polishing wheels may be of varying hardness levels, and may include one or several levels and/or wheels within the process.

During the grinding and/or polishing processes, a coolant may be used to limit heating of the glass substrate as it is ground and/or polished. For example, a typical processing coolant for mirror glass grinding and polishing is water, and optionally a series of oils or compounds may be added, if required or desired, to limit or reduce or prevent equipment rusting or bacteria growth, or to improve the level of surface finish. Typical water filtration may be sufficient to provide filtering down to about 5 microns. The quantity of water flow should be sufficient to supply coolant liquid to the glass/wheel surfaces from the inside (through head coolant) and outside (via spray nozzles, hose and/or the like). Typical water flow requirements are 50-80 gpm, but this can be process and equipment dependent.

During the grinding operation, a typical grinding process may have the grinding wheel spinning at about 4,000-6,000 RPM (or more or less), with a feed rate from about 120 in/min to about 400 in/min (or faster or slower), depending on process requirements, part dimensional features (such as a thinner edge of the glass substrate versus a thicker edge of the glass substrate), wheel composition and/or the like. The feed rates can vary during the grinding process as the grinding wheel moves along mirror glass edge, or the feed rates may be maintained constant during the grinding process or operation. During the polishing operation, a typical polishing process may have a polishing wheel spinning at about 3,000-5,000 RPM (or more or less), with a feed rate from about 30 in/min to about 200 in/min (or faster or slower feed rate), depending on process requirements, part dimensional features (such as a thinner edge of the glass substrate versus a thicker edge of the glass substrate), wheel composition and/or the like. The feed rates can vary during the polishing process as the polishing wheel moves along mirror glass edge, or the feed rates may be maintained constant during the polishing process or operation.

Optionally, and desirably, the mirror glass may be held via part fixturing during the grinding and/or polishing processes. For example, the mirror glass is typically held in such a way that it is at the required angle to the grind or polish wheel with all sides or edges of the mirror glass being able to be exposed to the grind or polish wheel, while maintaining the desired or selected or required part profile. Such part fixturing can be accomplished by a typical fixture that holds the properly aligned mirror glass by use of vacuum (such as via a suction cup type device that engages a surface of the mirror glass substrate inboard of the perimeter edges of the mirror glass substrate), keeping all edges exposed around the entire profile, while preventing the mirror glass from moving on the fixture and becoming misaligned relative to the grinding or polishing wheel. Another method may be to hold the prism between a lower support member and an upper retention arm that can pivot as needed to allow the selected or required mirror glass edge to be exposed to the grinding or polishing wheel. Such holding or fixturing methods may apply for fixtures used on CNC type equipment, robot controlled prism or wheel movement or the like, or any other suitable method for applying the grinding and polishing processes to the perimeter edges of the mirror glass substrate.

Optionally, for example, a method of preventing the mirror glass from moving, shifting and/or sliding at or on the surface of the fixture (and thus losing proper alignment) when lateral forces are applied during the grinding and polishing process may include applying a rubber or silicone material to the top of the fixture, beneath the mirror glass. Such a material may function to grip the under surface of the mirror glass as it is positioned on the fixture. A series of holes or channels may be established in or through the grip material to allow sufficient vacuum be drawn through the material via a vacuum source or the like.

Optionally, the selected or desired part geometry and profile of the mirror glass substrate may require unique or shared fixtures for many parts. The mirror glass must be sufficiently supported on the fixture side, while maintaining an exposed perimeter of about 3 mm to about 8 mm (or more or less) around the fixture to glass edge for proper grinding or polishing wheel clearance. This will help prevent the grinding or polishing wheel from contacting the fixture edge during operation, and such as when tool wear occurs and excessive wheel protrusion to the mirror glass underside takes place. The level of the exposed backside perimeter clearance desired or required is dependent on, but not limited to, the part geometry, the material thickness of the substrate, the part to wheel movement rates, the required surface finish, the speed of the process, the forces applied on the mirror glass substrate from the grinding wheel or polishing wheel and/or the like.

Therefore, the present invention provides a mirror assembly comprising a housing or casing having a two pocket or recessed back design, which allows for the mirror substrate to be adhered or otherwise attached to the attachment panel or panels or surfaces of the mirror casing, thereby eliminating the need for a separate attachment plate. The present invention also provides a bezelless mirror assembly comprising a mirror glass substrate (either a prismatic substrate or a planar substrate or a front substrate of an electro-optic reflective element) that has an exposed perimeter edge radius which gives the mirror a unique appearance and can eliminate the need for a bezel in electro-optic mirrors. Optionally, for example, a mirror assembly of the present invention may comprise a prismatic or planar reflective element that has exposed curved or rounded perimeter edges (and either is bonded to the attachment panels of the mirror casing without an attachment plate or is bonded to an attachment plate), thereby eliminating the need for a separate bezel element, or a mirror assembly of the present invention may comprise a prismatic or planar reflective element that is bonded to the attachment panels of the mirror casing (thereby eliminating the need for a separate attachment plate) and has a bezel portion around its perimeter edges. Optionally, for example, a mirror assembly of the present invention may comprise an electro-optic reflective element (such as an electrochromic reflective element) that has exposed curved or rounded perimeter edges of a front substrate (and either is bonded to the attachment panels of the mirror casing without an attachment plate or is bonded to an attachment plate), thereby eliminating the need for a separate bezel element, or a mirror assembly of the present invention may comprise an electro-optic reflective element (such as an electrochromic reflective element) that is bonded to the attachment panels of the mirror casing (thereby eliminating the need for a separate attachment plate) and has a bezel portion around its perimeter edges.

The present invention thus provides a mirror assembly comprising a recessed mirror casing (with the attachment panels or surfaces for attachment of the mirror reflective element thereto) that has generally planar reflective element attachment surfaces such that the reflective element is adhered or attached to a front or mounting surface of the mirror casing, with no separate mounting or backing plate at the reflective element for mounting the reflective element at or in the mirror casing and bezel portion. Thus, the mirror assembly may be readily assembled by attaching the mounting arm or structure to a unitarily molded mirror casing and attaching the reflective element to the unitary mirror casing to retain the reflective element at the mirror casing, and the bezel portion may be readily snapped or attached at the forward perimeter edges of the mirror casing. For mirror applications with one or more mirror-based accessories, the accessory or accessories may be received in or disposed at the rear recesses or cavities formed at the rear of the mirror casing and/or may be disposed at the mounting structure of the mirror assembly.

Although shown and described as interior rearview mirror assemblies attached to a windshield or in-cabin portion of a vehicle, it is envisioned that aspects of the present invention may be suitable for use in exterior rearview mirror applications. For example, an exterior rearview mirror may have a generally planar mirror glass substrate with rounded or curved exposed perimeter edges or may have an electro-optic reflective element with an oversized front substrate that has the rounded or curved exposed perimeter edges, while the rear substrate is received in the mirror casing. In applications where the mirror substrate is adhered or attached to the mirror casing panel or panels, the mirror casing itself may be adjustable relative to the side of the vehicle to which it is mounted to provide adjustment of the rearward and sideward field of view of the driver of the vehicle.

The rearview mirror assembly may comprise a prismatic mirror assembly (typically for interior mirror applications) or a non-electro-optic mirror assembly (such as a generally planar or optionally slightly curved mirror substrate typically for exterior mirror applications) or an electro-optic or electrochromic mirror assembly. For example, the rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and 4,435,042; and PCT Application No. PCT/US2004/015424, filed May 18, 2004, and published on Dec. 2, 2004, as International Publication No. WO 2004/103772, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, and/or PCT Application No. PCT/US2003/029776, filed Sep. 19, 2003, and published Apr. 1, 2004 as International Publication No. WO 2004/026633; and/or PCT Application No. PCT/US2004/015424, filed May 18, 2004, and published on Dec. 2, 2004, as International Publication No. WO 2004/103772, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and 6,315,421 (the entire disclosures of which are hereby incorporated by reference herein), that can benefit from the present invention.

Optionally, it is envisioned that the mirror assembly may comprise an electro-optic or electrochromic mirror assembly and may include an electro-optic or electrochromic reflective element. In such an embodiment, the perimeter of the reflective element may be encased or encompassed by a perimeter element to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or PCT Application No. PCT/US2010/029173, filed Mar. 30, 2010, which published Oct. 7, 2010 as International Publication No. WO 2010/114825, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties; and/or as described in U.S. Pat. No. 7,195,381, which is hereby incorporated herein by reference in its entirety. Optionally, the electrochromic circuitry and/or a glare sensor (such as a rearward facing glare sensor that receives light from rearward of the mirror assembly and vehicle through a port or opening along the casing and/or reflective element of the mirror assembly) and circuitry and/or an ambient light sensor and circuitry may be provided on one or more circuit boards of the mirror assembly. The mirror assembly may include one or more other displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,274,501; 7,255,451; 7,195,381; 7,184,190; 5,668,663; 5,724,187 and/or 6,690,268, and/or in U.S. patent application Ser. No. 11/226,628, filed Sep. 14, 2005, and published Mar. 23, 2006 as U.S. Patent Publication No. US 2006/0061008; and/or Ser. No. 10/538,724, filed Jun. 13, 2005, published Mar. 9, 2006 as U.S. Patent Publication No. US 2006/0050018, and/or PCT Application No. PCT/US2003/029776, filed Sep. 9, 2003, and published Apr. 1, 2004 as International Publication No. WO 2004/026633, which are all hereby incorporated herein by reference in their entireties. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036 and/or 7,274,501, and in PCT Application No. PCT/US2003/029776, filed Sep. 9, 2003, and published Apr. 1, 2004 as International Publication No. WO 2004/026633, which are all hereby incorporated herein by reference in their entireties.

Optionally, the mirror assembly may include user interface inputs, such as buttons or switches or touch or proximity sensors or the like, with which a user may adjust or control one or more accessories, such as via the principles described in U.S. Pat. No. 7,360,932, and/or U.S. patent application Ser. No. 12/091,525, filed Apr. 25, 2008, now U.S. Pat. No. 7,855,755; Ser. No. 11/239,980, filed Sep. 30, 2005, now U.S. Pat. No. 7,881,496; and/or Ser. No. 12/576,550, filed Oct. 9, 2009, now U.S. Pat. No. 8,465,161, and/or U.S. provisional application Ser. No. 60/618,686, filed Oct. 14, 2004, which are hereby incorporated herein by reference in their entireties.

The rearview mirror assembly may include a casing, such as described above, or the mirror assembly may comprise or utilize aspects of other types of casings or the like, such as described in U.S. Pat. Nos. 7,338,177; 7,289,037; 7,249,860; 6,439,755; 4,826,289 and 6,501,387; and/or PCT Application No. PCT/US2004/015424, filed May 18, 2004, and published on Dec. 2, 2004, as International Publication No. WO 2004/103772, which are all hereby incorporated herein by reference in their entireties, without affecting the scope of the present invention. For example, the mirror assembly may utilize aspects of the flush or frameless or bezelless reflective elements described in U.S. Pat. Nos. 7,289,037; 7,255,451; 7,274,501 and/or 7,184,190, and/or in PCT Application No. PCT/US2004/015424, filed May 18, 2004, and published on Dec. 2, 2004, as International Publication No. WO 2004/103772; PCT Application No. PCT/US2003/035381, filed Nov. 5, 2003, and published May 21, 2004 as International Publication No. WO 2004/042457; and/or in U.S. patent application Ser. No. 11/140,396, filed May 27, 2005, now U.S. Pat. No. 7,360,932; Ser. No. 11/226,628, filed Sep. 14, 2005, and published Mar. 23, 2006 as U.S. Patent Publication No. US 2006/0061008; Ser. No. 11/912,576, filed Oct. 25, 2005, now U.S. Pat. No. 7,626,749; and/or Ser. No. 10/538,724 (now abandoned), filed Jun. 13, 2005, published Mar. 9, 2006 as U.S. Patent Publication No. US 2006/0050018, which are all hereby incorporated herein by reference in their entireties.

Optionally, the mirror assembly may comprise a modular mirror construction, and may include back housing portions or the like, such as cap portions of the types described in U.S. Pat. No. 7,289,037 and PCT Application No. PCT/US2004/015424, filed May 18, 2004, and published on Dec. 2, 2004, as International Publication No. WO 2004/103772, which are hereby incorporated herein by reference in their entireties. A display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like for a video slide-out module (such as by utilizing aspects of the video mirrors described in U.S. Pat. Nos. 7,370,983 and 6,690,268, and/or U.S. patent application Ser. No. 10/538,724, filed Jun. 13, 2005, published Mar. 9, 2006 as U.S. Patent Publication No. US 2006/0050018; and/or Ser. No. 12/091,525, filed Apr. 25, 2008, now U.S. Pat. No. 7,855,755, which are hereby incorporated herein by reference in their entireties), and may be attachable to a reflective element and/or mirror casing to assemble the modular mirror assembly. The display screen module thus may be provided as an optional component or accessory for a vehicle, and may be readily assembled to a common reflective element and/or mirror casing of the mirror assembly.

Optionally, the mirror casing and/or reflective element may include customized or personalized viewable characteristics, such as color or symbols or indicia selected by the vehicle manufacturer or owner of the vehicle, such as the customization characteristics described in U.S. Pat. No. 7,289,037, and/or PCT Application No. PCT/US2004/015424, filed May 18, 2004, and published on Dec. 2, 2004, as International Publication No. WO 2004/103772; and/or U.S. patent application Ser. No. 11/912,576, filed Oct. 25, 2005, now U.S. Pat. No. 7,626,749; Ser. No. 11/243,783, filed Oct. 5, 2005; and/or Ser. No. 11/021,065, filed Dec. 23, 2004, now U.S. Pat. No. 7,255,451, which are hereby incorporated herein by reference in their entireties.

Optionally, the mirror assembly and/or prismatic or electrochromic reflective element may include one or more displays, such as for the accessories or circuitry described herein. The displays may be of types disclosed in U.S. Pat. Nos. 5,530,240 and/or 6,329,925, which are hereby incorporated herein by reference in their entireties, and/or may be display-on-demand or transflective type displays, such as the types disclosed in U.S. Pat. Nos. 7,581,859; 7,274,501; 7,195,381; 6,690,298; 5,668,663 and/or 5,724,187, and/or in U.S. patent application Ser. No. 11/226,628, filed Sep. 14, 2005 and published Mar. 23, 2006 as U.S. Patent Publication No. US 2006/0061008; Ser. No. 12/091,525, filed Jul. 15, 2008, now U.S. Pat. No. 7,855,755; and/or Ser. No. 10/993,302, filed Nov. 19, 2004, now U.S. Pat. No. 7,338,177, and/or in PCT Application No. PCT/US2003/029776, filed Sep. 19, 2003, and published Apr. 1, 2004 as International Publication No. WO 2004/026633, which are all hereby incorporated herein by reference in their entireties. Optionally, the prismatic reflective element may comprise a display on demand or transflective prismatic element (such as described in U.S. Pat. No. 7,274,501 and/or PCT Application No. PCT/US2003/029776, filed Sep. 19, 2003, and published Apr. 1, 2004 as International Publication No. WO 2004/026633; and/or U.S. patent application Ser. No. 10/993,302, filed Nov. 19, 2004, now U.S. Pat. No. 7,338,177, which are all hereby incorporated herein by reference in their entireties) so that the displays are viewable through the reflective element, while the display area still functions to substantially reflect light, in order to provide a generally uniform prismatic reflective element even in the areas that have display elements positioned behind the reflective element.

Such a video display screen device or module may comprise any type of video screen and is operable to display images in response to an input or signal from a control or imaging system. For example, the video display screen may comprise a multi-pixel liquid crystal module (LCM) or liquid crystal display (LCD), preferably a thin film transistor (TFT) multi-pixel liquid crystal display (such as discussed below), or the screen may comprise a multi-pixel organic electroluminescent display or a multi-pixel light emitting diode (LED), such as an organic light emitting diode (OLED) or inorganic light emitting diode display or the like, or a passive reflective and/or backlit pixelated display, or an electroluminescent (EL) display, or a vacuum fluorescent (VF) display or the like. For example, the video display screen may comprise a video screen of the types disclosed in U.S. Pat. Nos. 7,370,983; 7,338,177; 7,274,501; 7,255,451; 7,195,381; 7,184,190; 6,902,284; 6,690,268; 6,428,172; 6,420,975; 5,668,663; 5,724,187; 5,416,313; 5,285,060; 5,193,029 and/or 4,793,690, and/or U.S. patent application Ser. No. 10/538,724, filed Jun. 13, 2005, published Mar. 9, 2006 as U.S. Patent Publication No. US 2006/0050018; Ser. No. 11/226,628, filed Sep. 14, 2005 and published Mar. 23, 2006 as U.S. Patent Publication No. US 2006/0061008; Ser. No. 12/091,525, filed Apr. 25, 2008, now U.S. Pat. No. 7,855,755; Ser. No. 09/585,379 (now abandoned), filed Jun. 1, 2000; Ser. No. 10/207,291, filed Jul. 29, 2002; and/or Ser. No. 10/538,724, filed Jun. 13, 2005, published Mar. 9, 2006 as U.S. Patent Publication No. US 2006/0050018, which are hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, such as the types disclosed in U.S. Pat. Nos. 5,550,677; 5,760,962; 6,396,397; 6,097,023; 5,877,897 and 5,796,094, and/or U.S. patent application Ser. No. 10/534,632, filed May 11, 2005, now U.S. Pat. No. 7,965,336, which are hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle.

Optionally, the mirror assembly may include or may be associated with a compass sensor and circuitry for a compass system that detects and displays the vehicle directional heading to a driver of the vehicle. Optionally, an integrated automotive "compass-on-a-chip" may be disposed in a cavity of the mounting base of the mirror (or within the mirror housing or in an attachment to the mirror mount or elsewhere within the mirror assembly such as to the rear of the video screen or to the rear of the mirror reflective element) and may comprise at least two magneto-responsive sensor elements (such as a Hall sensor or multiple Hall sensors), associated A/D and D/A converters, associated microprocessor(s) and memory, associated signal processing and filtering, associated display driver and associated LIN/CAN BUS interface and the like, all (or a sub-set thereof) created or disposed or commonly established onto a semiconductor chip surface/substrate or silicon substrate, such as utilizing CMOS technology and/or fabrication techniques as known in the semiconductor manufacturing arts, and constituting an ASIC chip, such as utilizing principles described in U.S. Pat. Nos. 7,329,013 and/or 7,370,983, and/or U.S. patent application Ser. No. 11/226,628, filed Sep. 14, 2005, and published Mar. 23, 2006 as U.S. Patent Publication No. US 2006/0061008, which are hereby incorporated herein by reference in their entireties, which are hereby incorporated herein by reference in their entireties, and/or such as by utilizing aspects of an EC driver-on-a-chip such as described in U.S. patent application Ser. No. 11/201,661, filed Aug. 11, 2005, now U.S. Pat. No. 7,480,149, which is hereby incorporated herein by reference in its entirety. The ASIC chip may be small (preferably less than approximately a two square centimeter area, more preferably less than approximately a 1.5 square centimeter area, and most preferably less than approximately a one square centimeter area or thereabouts) and readily packagable into the mirror assembly (or a feed from such a compass-on-a-chip may be provided to the mirror assembly from a compass-on-a-chip packaged elsewhere in the vehicle cabin remote from the mirror assembly such as in an instrument panel portion or in roof console portion). Such large scale integration onto the likes of the silicon substrate/chip can allow a compass functionality to be provided by a relatively small chip, and with appropriate pin out or electrical leads provided as is common in the electrical art.

Optionally, a compass chip or compass module may be disposed at an upper end of the mounting base of a mirror assembly, such as at an upper or connecting end of a wire management element connected to or extending from the mounting base of the mirror assembly, such as by utilizing aspects of the mirror systems described in U.S. patent application Ser. No. 12/578,732, filed Oct. 14, 2009 and published Apr. 22, 2010 as U.S. Publication No. US-2010-0097469, which is hereby incorporated herein by reference in its entirety. The wire management system may include a wire management element or channel or cover element, such as by utilizing aspects of the wire management systems or elements described in U.S. patent application Ser. No. 11/226,628, filed Sep. 14, 2005, and published Mar. 23, 2006 as U.S. Patent Publication No. US 2006/0061008; and/or Ser. No. 11/584,697, filed Oct. 20, 2006, now U.S. Pat. No. 7,510,287, which are hereby incorporated herein by reference in their entireties.

The compass chip may be in communication with a compass display, which may provide a display region at the reflective element, and which includes ports or portions, which may comprise icons, characters or letters or the like representative of only the cardinal directional points, such as, for example, the characters N, S, E, W, formed or etched in the reflective film coating of the reflective element (and forming a transparent window therein), such as via techniques such as disclosed in commonly assigned U.S. Pat. Nos. 4,882,565 and/or 7,004,593, which are hereby incorporated by reference herein in their entireties. Optionally, however, reflective element may comprise a transflective or display on demand (DOD) reflective element, and the compass display may be a display on demand (DOD) type of display, such as disclosed in commonly assigned U.S. Pat. Nos. 7,195,381; 6,690,268; 5,668,663 and 5,724,187, which are hereby incorporated by reference herein in their entireties, without affecting the scope of the present invention.

Optionally, the compass system and compass circuitry may utilize aspects of the compass systems described in U.S. Pat. Nos. 7,370,983; 7,329,013; 7,289,037; 7,249,860; 7,004,593; 6,928,366; 6,642,851; 6,140,933; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460 and/or 6,513,252, and/or PCT Application No. PCT/US2004/015424, filed May 18, 2004, and published on Dec. 2, 2004, as International Publication No. WO 2004/103772, and/or European patent application, published Oct. 11, 2000 under Publication No. EP 0 1043566, and/or U.S. patent application Ser. No. 11/226,628, filed Sep. 14, 2005, and published Mar. 23, 2006 as U.S. Patent Publication No. US 2006/0061008, which are all hereby incorporated herein by reference in their entireties. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The sensor or sensors may be positioned at and within a base portion or mounting base of the mirror assembly so that the sensor/sensors is/are substantially fixedly positioned within the vehicle, or may be attached or positioned within the mirror casing. Note that the magneto-responsive sensor used with the mirror assembly may comprise a magneto-responsive sensor, such as a magneto-resistive sensor, such as the types disclosed in U.S. Pat. Nos. 5,255,442; 5,632,092; 5,802,727; 6,173,501; 6,427,349 and 6,513,252 (which are hereby incorporated herein by reference in their entireties), or a magneto-inductive sensor, such as described in U.S. Pat. No. 5,878,370 (which is hereby incorporated herein by reference in its entirety), or a magneto-impedance sensor, such as the types described in PCT Publication No. WO 2004/076971, published Sep. 10, 2004 (which is hereby incorporated herein by reference in its entirety), or a Hall-effect sensor, such as the types described in U.S. Pat. Nos. 6,278,271; 5,942,895 and 6,184,679 (which are hereby incorporated herein by reference in their entireties). The sensor circuitry and/or the circuitry in the mirror housing and associated with the sensor may include processing circuitry. For example, a printed circuit board may include processing circuitry which may include compensation methods, such as those described in U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460 and 6,642,851, which are all hereby incorporated herein by reference in their entireties. The compass sensor may be incorporated in or associated with a compass system and/or display system for displaying a directional heading of the vehicle to the driver, such as a compass system of the types described in U.S. Pat. Nos. 5,924,212; 4,862,594; 4,937,945; 5,131,154; 5,255,442; 5,632,092; 7,004,593 and/or 7,289,037, and/or PCT Application No. PCT/US2004/015424, filed May 18, 2004, and published on Dec. 2, 2004, as International Publication No. WO 2004/103772, which are all hereby incorporated herein by reference in their entireties.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or, and/or PCT Application No. PCT/US2003/003012, filed Jan. 31, 2003, and published Aug. 7, 2003 as International Publication No. WO 03/065084, and/or PCT Application No. PCT/US2003/040611, filed Dec. 19, 2003, and published Jul. 15, 2004 as International Publication No. WO 2004/058540, and/or PCT Application No. PCT/US2004/015424, filed May 18, 2004, and published on Dec. 2, 2004, as International Publication No. WO 2004/103772, which are hereby incorporated herein by reference in their entireties.

Optionally, the user inputs of the mirror assembly may comprise other types of buttons or switches for controlling or activating/deactivating one or more electrical accessories or devices of or associated with the mirror assembly. The mirror assembly may comprise any type of switches or buttons, such as touch or proximity sensing switches, such as touch or proximity switches of the types described above, or the inputs may comprise other types of buttons or switches, such as those described in U.S. patent application Ser. No. 12/414,190, filed Mar. 30, 2009, now U.S. Pat. No. 8,154,418, and/or Ser. No. 11/029,695, filed Jan. 5, 2005, now U.S. Pat. No. 7,253,723, which are hereby incorporated herein by reference in their entireties, or such as fabric-made position detectors, such as those described in U.S. Pat. Nos. 6,504,531; 6,501,465; 6,492,980; 6,452,479; 6,437,258 and 6,369,804, which are hereby incorporated herein by reference in their entireties. For example, the inputs may comprise a touch or proximity sensor of the types commercially available from TouchSensor Technologies, LLC of Wheaton, Ill. The touch or proximity sensor may be operable to generate an electric field and to detect the presence of a conductive mass entering the field. When a voltage is applied to the sensor, the sensor generates the electric field, which emanates through any dielectric material, such as plastic or the like, at the sensor. When a conductive mass (such as a person's finger or the like, or metal or the like) enters the electric field, the sensor may detect a change in the field and may indicate such a detection. Other types of switches or buttons or inputs or sensors may be incorporated to provide the desired function, without affecting the scope of the present invention.

Optionally, the user inputs or buttons may comprise user inputs for a garage door opening system, such as a vehicle based garage door opening system of the types described in U.S. Pat. Nos. 6,396,408; 6,362,771; 7,023,322 and 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; 6,946,978; 7,308,341; 7,167,796; 7,004,593; 7,657,052 and/or 6,678,614, and/or PCT Application No. PCT/US2003/040611, filed Dec. 19, 2003, and published Jul. 15, 2004 as International Publication No. WO 2004/058540, and/or PCT Application No. PCT/US2003/030877, filed Oct. 1, 2003, and published Apr. 15, 2004 as International Publication No. WO 2004/032568, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268;

5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, microphones, such as disclosed in U.S. Pat. Nos. 6,243,003; 6,278,377 and/or 6,420,975; and/or U.S. patent application Ser. No. 10/529,715, filed Mar. 30, 2005, now U.S. Pat. No. 7,657,052; and/or PCT Application No. PCT/US2003/030877, filed Oct. 1, 2003, and published Apr. 15, 2004 as International Publication No. WO 2004/032568, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 5,929,786 and/or 5,786,772, and/or U.S. patent application Ser. No. 10/427,051, filed Apr. 30, 2003, now U.S. Pat. No. 7,038,577; and Ser. No. 10/209,173, filed Jul. 31, 2002, now U.S. Pat. No. 6,882,287; and/or Ser. No. 11/315,675, filed Dec. 22, 2005, now U.S. Pat. No. 7,720,580, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 6,690,268; 6,847,487 and/or 7,400,435, and/or U.S. provisional application Ser. No. 60/618,686, filed Oct. 14, 2004, and/or U.S. patent application Ser. No. 11/105,757, filed Apr. 14, 2005, now U.S. Pat. No. 7,526,103, and/or Ser. No. 11/239,980, filed Sep. 30, 2005, now U.S. Pat. No. 7,881,496, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or an ONSTAR® system, a compass, such as disclosed in U.S. Pat. Nos. 5,924,212; 4,862,594; 4,937,945; 5,131,154; 5,255,442 and/or 5,632,092, and/or any other accessory or circuitry or the like (with all of the above-referenced patents and PCT and U.S. patent applications being commonly assigned, and with the disclosures of the referenced patents and patent applications being hereby incorporated herein by reference in their entireties).

Optionally, the mirror assembly (such as at the mounting base, which may be fixed relative to the vehicle windshield) may include an imaging sensor (such as a forward facing imaging sensor or camera that has a forward field of view through the vehicle windshield) that may be part of or may provide an image output for a vehicle vision system, such as a headlamp control system or lane departure warning system or object detection system or other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,038,577 and 7,004,606; and/or U.S. patent application Ser. No. 11/315,675, filed Dec. 22, 2005, now U.S. Pat. No. 7,720,580; Ser. No. 10/534,632, filed May 11, 2005, now U.S. Pat. No. 7,965,336; Ser. No. 12/091,359 (now abandoned), filed Jun. 10, 2008, published Oct. 1, 2009 as U.S. Patent Publication No. US 2009/0244361; and/or Ser. No. 12/377,054, filed Feb. 10, 2009, now U.S. Pat. No. 7,972,045; and/or PCT Application No. PCT/US2006/041709 filed Oct. 27, 2006, published May 10, 2007 as PCT Publication No. WO 07/053404; and/or PCT Application No. PCT/US2007/075702, filed Aug. 10, 2007, published Feb. 28, 2008 as PCT Publication No. WO 08/024639, which are all hereby incorporated herein by reference in their entireties. The sensor may include a lens element or optic between the imaging plane of the imaging sensor and the forward scene to substantially focus the scene at an image plane of the imaging sensor. The imaging sensor may comprise an image sensing module or the like, and may utilize aspects described in U.S. patent application Ser. No. 10/534,632, filed May 11, 2005, now U.S. Pat. No. 7,965,336; and/or PCT Application No. PCT/US2006/041709, filed Oct. 27, 2006 and published May 10, 2007 as International Publication No. WO 07/053404; and/or PCT Application No. PCT/US2003/036177 filed Nov. 14, 2003 and published Jun. 3, 2004 as PCT Publication No. WO 2004/047421, which are hereby incorporated herein by reference in their entireties.

Optionally, the accessory or accessories, such as those described above and/or below, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. A method of making a mirror substrate for a vehicular rearview mirror assembly, the method comprising:
   providing a glass substrate having a planar front surface, a planar rear surface and a circumferential perimeter edge about a periphery of the glass substrate and extending between the planar front surface and the planar rear surface, wherein the planar front surface and the perimeter edge meet at a front perimeter edge portion of the glass substrate that circumscribes the glass substrate;
   positioning the glass substrate at a fixture to support the glass substrate;
   grinding the front perimeter edge portion of the glass substrate by moving a grinding wheel around the periphery of the glass substrate while rotating the grinding wheel about a grinding wheel axis to establish a rounded surface about and around the periphery of the glass substrate and between the planar front surface and a rear portion of the perimeter edge of the glass substrate;
   wherein the rounded surface has a radius of curvature of at least 2.5 mm;
   wherein the rounded surface provides a curved transition between the planar front surface of the glass substrate and the rear portion of the perimeter edge of the glass substrate; and
   coating the planar rear surface of the glass substrate with a coating.

2. The method of claim 1, comprising, after grinding the front perimeter edge portion of the glass substrate to establish the rounded surface, moving a polishing wheel around the periphery of the glass substrate while rotating the polishing wheel about a polishing wheel axis to polish the rounded surface about and around the periphery of the glass substrate.

3. The method of claim 2, wherein the grinding wheel axis is at a 90 degree angle relative to the planar front surface of the glass substrate, and wherein the polishing wheel axis is at a 90 degree angle relative to the planar front surface of the glass substrate.

4. The method of claim 2, wherein at least one selected from the group consisting of (i) the grinding wheel is pivotable to adjust the grinding wheel axis relative to the planar front surface of the glass substrate and (ii) the polishing wheel is pivotable to adjust the polishing wheel axis relative to the planar front surface of the glass substrate.

5. The method of claim 1, wherein the grinding wheel is attached to a movable head that is movable under computer control around the periphery of the glass substrate.

6. The method of claim 5, wherein the computer control comprises computer numerical control.

7. The method of claim 5, wherein the movable head is robotically controlled.

8. The method of claim 5, wherein the grinding wheel axis is at a 90 degree angle relative to the planar front surface of the glass substrate.

9. The method of claim 5, wherein the grinding wheel is pivotable to adjust the grinding wheel axis relative to the planar front surface of the glass substrate.

10. The method of claim 1, wherein the planar front surface is angled relative to the planar rear surface, and wherein the step of coating the planar rear surface of the glass substrate comprises coating the planar rear surface of the glass substrate with a mirror reflector coating to make a prismatic mirror substrate for a vehicular prismatic interior rearview mirror assembly.

11. The method of claim 1, wherein the planar front surface is parallel to the planar rear surface, and wherein the step of coating the planar rear surface of the glass substrate comprises coating the planar rear surface of the glass substrate with a transparent electrically conductive coating to make a front mirror substrate for an electro-optic rearview mirror assembly.

12. The method of claim 1, wherein the glass substrate has a length dimension and a width dimension and wherein the length dimension is larger than the width dimension, and wherein the glass substrate has a non-rectangular shape.

13. A method of making a mirror substrate for a vehicular rearview mirror assembly, the method comprising:
   providing a glass substrate having a planar front surface, a planar rear surface and a circumferential perimeter edge about a periphery of the glass substrate and extending between the planar front surface and the planar rear surface, wherein the planar front surface and the perimeter edge meet at a front perimeter edge portion of the glass substrate that circumscribes the glass substrate;
   wherein the planar front surface is angled relative to the planar rear surface;
   positioning the glass substrate at a fixture to support the glass substrate;
   grinding the front perimeter edge portion of the glass substrate by moving a grinding wheel around the periphery of the glass substrate while rotating the grinding wheel about a grinding wheel axis to establish a rounded surface about and around the periphery of the glass substrate and between the planar front surface and a rear portion of the perimeter edge of the glass substrate;
   wherein the grinding wheel is attached to a movable head that is movable under computer control around the periphery of the glass substrate;
   wherein the rounded surface has a radius of curvature of at least 2.5 mm;
   wherein the rounded surface provides a curved transition between the planar front surface of the glass substrate and the rear portion of the perimeter edge of the glass substrate; and
   coating the planar rear surface of the glass substrate with a mirror reflector coating to make a prismatic mirror substrate for a vehicular prismatic interior rearview mirror assembly.

14. The method of claim 13, comprising, after grinding the front perimeter edge portion of the glass substrate to establish the rounded surface, moving a polishing wheel around the periphery of the glass substrate while rotating the polishing wheel about a polishing wheel axis to polish the rounded surface about and around the periphery of the glass substrate.

15. The method of claim 14, wherein the grinding wheel axis is at a 90 degree angle relative to the planar front surface of the glass substrate, and wherein the polishing wheel axis is at a 90 degree angle relative to the planar front surface of the glass substrate.

16. The method of claim 14, wherein at least one selected from the group consisting of (i) the grinding wheel is pivotable to adjust the grinding wheel axis relative to the planar front surface of the glass substrate and (ii) the polishing wheel is pivotable to adjust the polishing wheel axis relative to the planar front surface of the glass substrate.

17. A method of making a mirror substrate for a vehicular rearview mirror assembly, the method comprising:

provinding a glass substrate having a planar front surface, a planar rear surface and a circumferential perimeter edge about a periphery of the glass substrate and extending between the planar front surface and the planar rear surface, wherein the planar front surface and the perimeter edge meet at a front perimeter edge portion of the glass substrate that circumscribes the glass substrate;

wherein the planar front surface is parallel to the planar rear surface;

positioning the glass substrate at a fixture to support the glass substrate;

grinding the front perimeter edge portion of the glass substrate by moving a grinding wheel around the periphery of the glass substrate while rotating the grinding wheel about a grinding wheel axis to establish a rounded surface about and around the periphery of the glass substrate and between the planar front surface and a rear portion of the perimeter edge of the glass substrate;

wherein the grinding wheel is attached to a movable head that is movable under computer control around the periphery of the glass substrate;

wherein the rounded surface has a radius of curvature of at least 2.5 mm;

wherein the rounded surface provides a curved transition between the planar front surface of the glass substrate and the rear portion of the perimeter edge of the glass substrate; and coating the planar rear surface of the glass substrate with a transparent electrically conductive coating to make a front mirror substrate for an electro-optic rearview mirror assembly.

18. The method of claim 17, comprising, after grinding the front perimeter edge portion of the glass substrate to establish the rounded surface, moving a polishing wheel around the periphery of the glass substrate while rotating the polishing wheel about a polishing wheel axis to polish the rounded surface about and around the periphery of the glass substrate.

19. The method of claim 18, wherein the grinding wheel axis is at a 90 degree angle relative to the planar front surface of the glass substrate, and wherein the polishing wheel axis is at a 90 degree angle relative to the planar front surface of the glass substrate.

20. The method of claim 18, wherein at least one selected from the group consisting of (i) the grinding wheel is pivotable to adjust the grinding wheel axis relative to the planar front surface of the glass substrate and (ii) the polishing wheel is pivotable to adjust the polishing wheel axis relative to the planar front surface of the glass substrate.

* * * * *